(12) United States Patent
Elshafie et al.

(10) Patent No.: US 12,659,731 B2
(45) Date of Patent: Jun. 16, 2026

(54) PHYSICAL LAYER SECRET-KEY CONFIGURATION AND SIGNALING

(71) Applicant: QUALCOMM Incorporated, San Diego, CA (US)

(72) Inventors: Ahmed Elshafie, San Diego, CA (US); Hung Dinh Ly, San Diego, CA (US); Alexandros Manolakos, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 453 days.

(21) Appl. No.: 18/150,758

(22) Filed: Jan. 5, 2023

(65) Prior Publication Data

US 2024/0236664 A1      Jul. 11, 2024

(51) Int. Cl.
*H04M 1/66*       (2006.01)
*H04W 12/0431*    (2021.01)

(52) U.S. Cl.
CPC ............................... *H04W 12/0431* (2021.01)

(58) Field of Classification Search
CPC ... H04W 12/06; H04W 12/069; H04W 12/08; H04W 12/0431; H04W 12/041; H04W 12/79; H04W 76/15; H04W 84/12; H04W 12/03; H04L 63/18; H04L 63/0457; H04L 5/001; H04L 9/065
See application file for complete search history.

(56) References Cited

U.S. PATENT DOCUMENTS

| | | | | |
|---|---|---|---|---|
| 2002/0068588 A1* | 6/2002 | Yoshida | ................ | H04L 1/0002 455/461 |
| 2013/0036305 A1* | 2/2013 | Yadav | ..................... | H04L 63/12 713/168 |
| 2015/0201334 A1* | 7/2015 | Li | .......................... | H04W 12/08 726/3 |
| 2018/0285555 A1* | 10/2018 | Dong | .................. | H04L 63/0428 |
| 2020/0196298 A1* | 6/2020 | Edge | ..................... | H04W 4/029 |
| 2021/0195563 A1* | 6/2021 | Lee | ..................... | H04W 12/041 |
| 2023/0007478 A1* | 1/2023 | Chen | ..................... | H04W 64/00 |
| 2023/0208517 A1* | 6/2023 | Bakopoulos | ........... | H04B 10/11 398/118 |
| 2024/0015008 A1* | 1/2024 | Morchon | .............. | H04L 9/0833 |

* cited by examiner

*Primary Examiner* — Shantell L Heiber
(74) *Attorney, Agent, or Firm* — Holland & Hart LLP /Qualcomm

(57)          ABSTRACT

Methods, systems, and devices for wireless communications are described A user equipment (UE) may receive, from a base station, a first control message that includes a mapping of each security key of a set of security keys to respective security key identifiers. The UE may identify that a first security key identifier is associated with one or more channels to be used for communications between the UE and the base station. In some cases, the UE may receive a control message that schedules communications via the one or more channels. The first security key identifier may be associated with a first security key of the set of security keys. The UE may communicate with the base station using the first security key. The communications with the base station may be secured using the first security key.

28 Claims, 16 Drawing Sheets

510

520

515

505

500

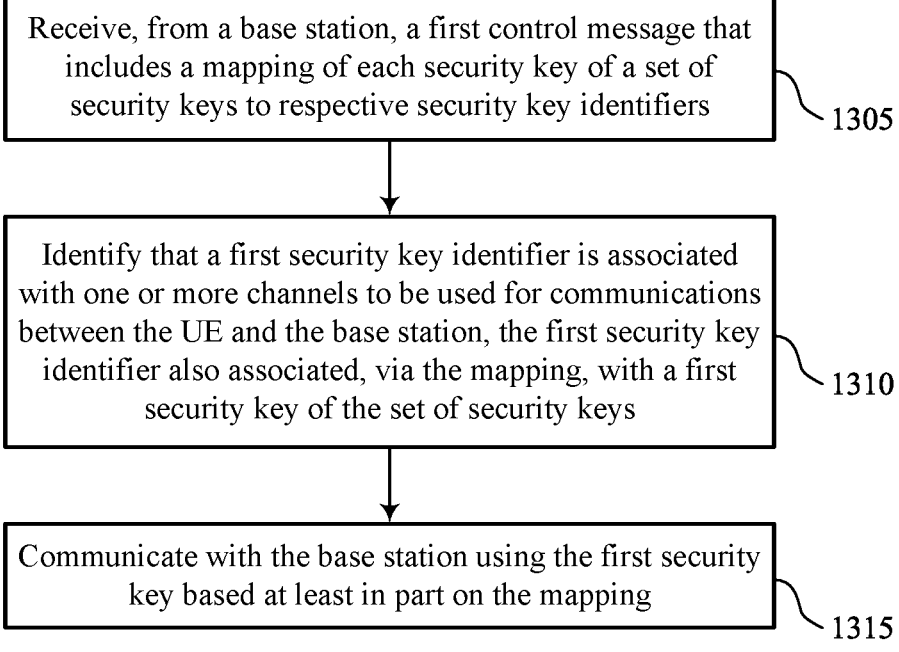

Receive, from a base station, a first control message that includes a mapping of each security key of a set of security keys to respective security key identifiers

1305

Identify that a first security key identifier is associated with one or more channels to be used for communications between the UE and the base station, the first security key identifier also associated, via the mapping, with a first security key of the set of security keys

1310

Communicate with the base station using the first security key based at least in part on the mapping

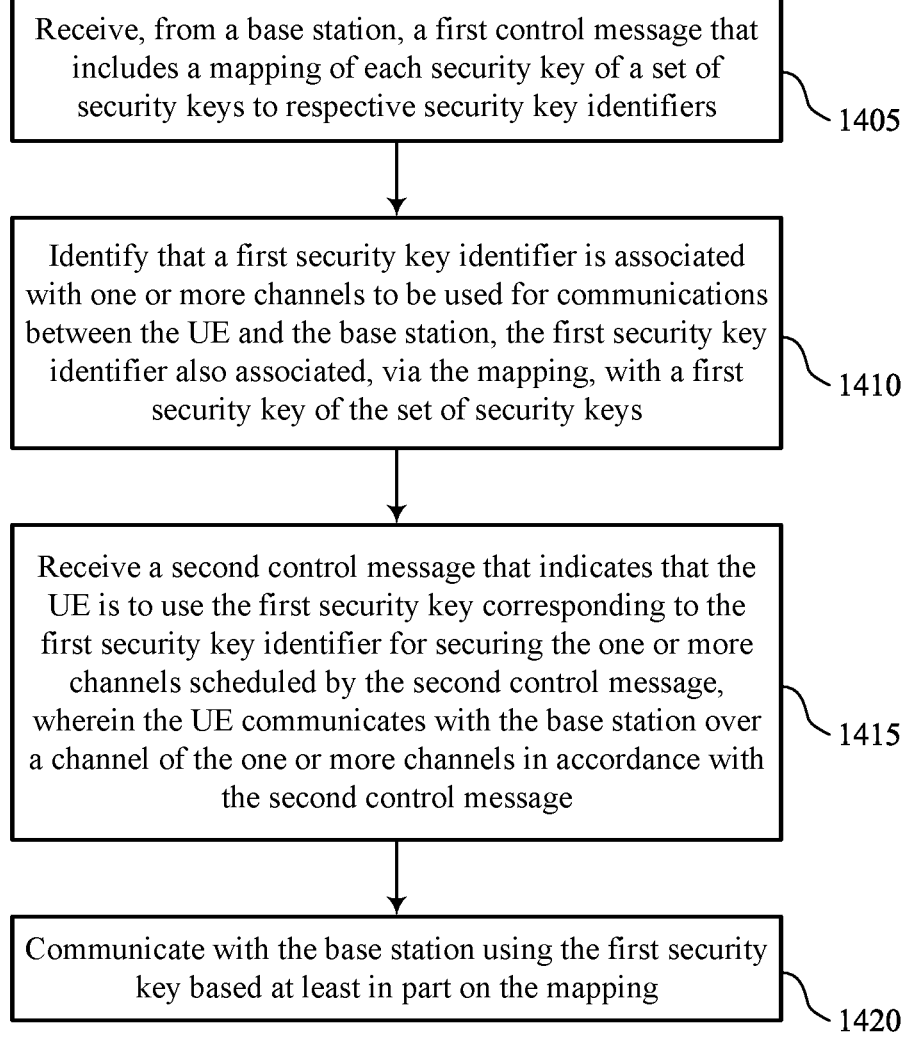

Receive, from a base station, a first control message that includes a mapping of each security key of a set of security keys to respective security key identifiers

1405

Identify that a first security key identifier is associated with one or more channels to be used for communications between the UE and the base station, the first security key identifier also associated, via the mapping, with a first security key of the set of security keys

1410

Receive a second control message that indicates that the UE is to use the first security key corresponding to the first security key identifier for securing the one or more channels scheduled by the second control message, wherein the UE communicates with the base station over a channel of the one or more channels in accordance with the second control message

1415

Communicate with the base station using the first security key based at least in part on the mapping

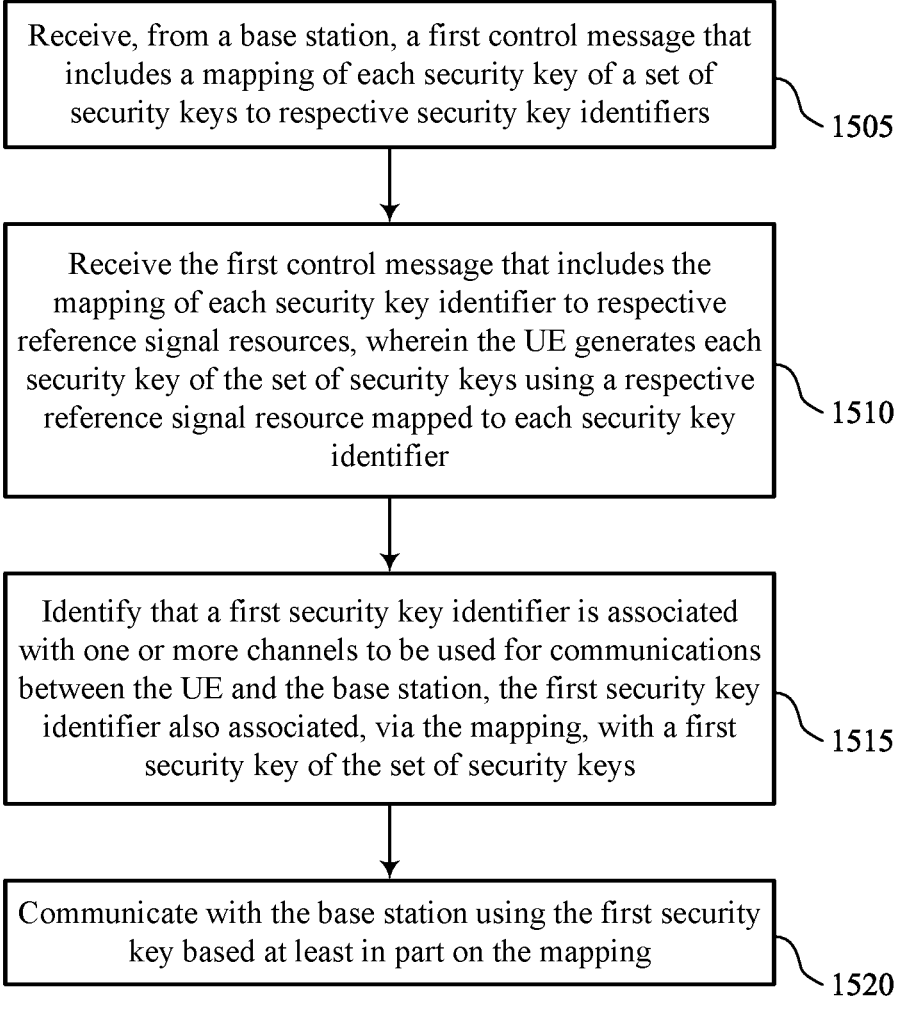

Receive, from a base station, a first control message that includes a mapping of each security key of a set of security keys to respective security key identifiers

1505

Receive the first control message that includes the mapping of each security key identifier to respective reference signal resources, wherein the UE generates each security key of the set of security keys using a respective reference signal resource mapped to each security key identifier

1510

Identify that a first security key identifier is associated with one or more channels to be used for communications between the UE and the base station, the first security key identifier also associated, via the mapping, with a first security key of the set of security keys

1515

Communicate with the base station using the first security key based at least in part on the mapping

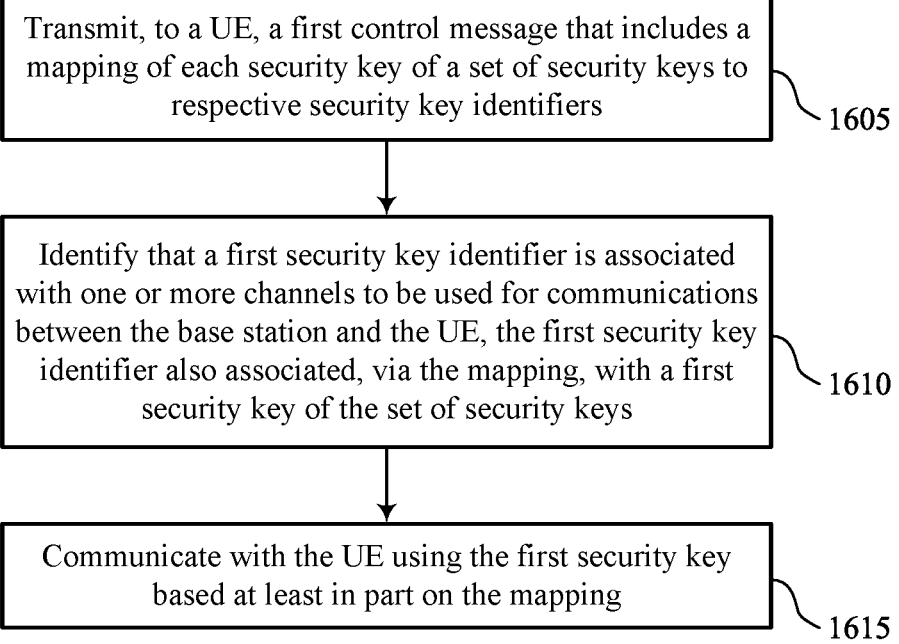

Transmit, to a UE, a first control message that includes a mapping of each security key of a set of security keys to respective security key identifiers ⟋ 1605

Identify that a first security key identifier is associated with one or more channels to be used for communications between the base station and the UE, the first security key identifier also associated, via the mapping, with a first security key of the set of security keys ⟋ 1610

Communicate with the UE using the first security key based at least in part on the mapping ⟋ 1615

PHYSICAL LAYER SECRET-KEY CONFIGURATION AND SIGNALING

FIELD OF TECHNOLOGY

The following relates to wireless communications, including physical layer secret-key configuration and signaling.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may implement security schemes to secure or encrypt communications between devices, such as communications between a base station and a UE. In some examples, the devices may use a security key to secure such communications. These techniques may be used to reduce or limit the ability for other devices, such as other UEs, to eavesdrop on communications and identify data intended to be secure.

SUMMARY

The described techniques relate to improved methods, systems, devices, and apparatuses that support physical layer secret-key configuration and signaling. Generally, the described techniques provide for security key management for user equipments (UEs) in a wireless communications system. A UE may receive, from a base station, a first control message that includes a mapping of each security key of a set of security keys to respective security key identifiers. The UE may identify that a first security key identifier is associated with one or more channels to be used for communications between the UE and the base station. In some cases, the UE may receive a control message that schedules communications via the one or more channels. The first security key identifier may be associated with a first security key of the set of security keys. The UE may communicate with the base station using the first security key. The communications with the base station may be secured using the first security key.

A method for wireless communication at a user equipment (UE) is described. The method may include receiving, from a base station, a first control message that includes a mapping of each security key of a set of security keys to respective security key identifiers, identifying that a first security key identifier is associated with one or more channels to be used for communications between the UE and the base station, the first security key identifier also associated, via the mapping, with a first security key of the set of security keys, and communicating with the base station using the first security key based on the mapping.

A UE for wireless communication is described. The UE may include a processor, memory coupled with the processor, and instructions stored in the memory. The instructions may be executable by the processor to cause the UE to receive, from a base station, a first control message that includes a mapping of each security key of a set of security keys to respective security key identifiers, identify that a first security key identifier is associated with one or more channels to be used for communications between the UE and the base station, the first security key identifier also associated, via the mapping, with a first security key of the set of security keys, and communicate with the base station using the first security key based on the mapping.

Another UE for wireless communication is described. The UE may include means for receiving, from a base station, a first control message that includes a mapping of each security key of a set of security keys to respective security key identifiers, means for identifying that a first security key identifier is associated with one or more channels to be used for communications between the UE and the base station, the first security key identifier also associated, via the mapping, with a first security key of the set of security keys, and means for communicating with the base station using the first security key based on the mapping.

A non-transitory computer-readable medium storing code for wireless communication at a UE is described. The code may include instructions executable by a processor to receive, from a base station, a first control message that includes a mapping of each security key of a set of security keys to respective security key identifiers, identify that a first security key identifier is associated with one or more channels to be used for communications between the UE and the base station, the first security key identifier also associated, via the mapping, with a first security key of the set of security keys, and communicate with the base station using the first security key based on the mapping.

In some examples of the method, UEs, and non-transitory computer-readable medium described herein, receiving the first control message may include operations, features, means, or instructions for receiving the first control message that includes a mapping of each security key identifier corresponding to the set of security keys to respective sets of channels.

In some examples of the method, UEs, and non-transitory computer-readable medium described herein, identifying that the first security key identifier may be associated with the one or more channels may include operations, features, means, or instructions for receiving a second control message that schedules a communication over the one or more channels that may be associated with the first security key identifier, where the UE communicates with the base station over the one or more channels that may be secured by the first security key.

In some examples of the method, UEs, and non-transitory computer-readable medium described herein, receiving the first control message may include operations, features, means, or instructions for receiving the first control message that includes the mapping of the first security key identifier to a high priority channel or to a low priority channel.

In some examples of the method, UEs, and non-transitory computer-readable medium described herein, identifying that the first security key identifier may be associated with the one or more channels may include operations, features, means, or instructions for receiving a second control message that schedules a communication over one of the high priority channel and the low priority channel that may be mapped to the first security key identifier by the first control message, where the UE communicates with the base station over the high priority channel secured using the first security key or over the low priority channel that may be secured using the first security key in accordance with the second control message.

In some examples of the method, UEs, and non-transitory computer-readable medium described herein, identifying that the first security key identifier may be associated with the one or more channels may include operations, features, means, or instructions for receiving a second control message that indicates that the UE may be to use the first security key corresponding to the first security key identifier for securing the one or more channels scheduled by the second control message, where the UE communicates with the base station over a channel of the one or more channels in accordance with the second control message.

In some examples of the method, UEs, and non-transitory computer-readable medium described herein, receiving the first control message may include operations, features, means, or instructions for receiving the first control message that includes the mapping of each security key identifier to respective reference signal resources, where the UE generates each security key of the set of security keys using a respective reference signal resource mapped to each security key identifier.

In some examples of the method, UEs, and non-transitory computer-readable medium described herein, each reference signal resource may be a sounding reference signal resource, a channel state information reference signal resource, or both.

Some examples of the method, UEs, and non-transitory computer-readable medium described herein may further include operations, features, means, or instructions for receiving a second control message that indicates a new security key and a second security key identifier and updating the set of security keys to include the new security key using the second security key identifier.

In some examples of the method, UEs, and non-transitory computer-readable medium described herein, receiving the second control message may include operations, features, means, or instructions for receiving the second control message that includes an indication that the second control message includes the new security key, where the set of security keys may be updated based on the indication in the second control message.

In some examples of the method, UEs, and non-transitory computer-readable medium described herein, receiving the second control message may include operations, features, means, or instructions for receiving a medium access control layer control element message or a radio resource control message.

In some examples of the method, UEs, and non-transitory computer-readable medium described herein, receiving the second control message may include operations, features, means, or instructions for receiving the second control message that may be secured at a higher layer than a layer on which the second control message may be received.

In some examples of the method, UEs, and non-transitory computer-readable medium described herein, receiving the first control message may include operations, features, means, or instructions for receiving a radio resource control message that includes the mapping of each security key of the set of security keys to respective security key identifiers.

In some examples of the method, UEs, and non-transitory computer-readable medium described herein, identifying that the first security key identifier may be associated with the one or more channels may include operations, features, means, or instructions for receiving a downlink control information message or a medium access control layer control element message that indicates the first security key identifier and schedules the one or more channels.

A method for wireless communications at a base station is described. The method may include transmitting, to a UE, a first control message that includes a mapping of each security key of a set of security keys to respective security key identifiers, identifying that a first security key identifier is associated with one or more channels to be used for communications between the base station and the UE, the first security key identifier also associated, via the mapping, with a first security key of the set of security keys, and communicating with the UE using the first security key based on the mapping.

A base station for wireless communications is described. The base station may include a processor, memory coupled with the processor, and instructions stored in the memory. The instructions may be executable by the processor to cause the base station to transmit, to a UE, a first control message that includes a mapping of each security key of a set of security keys to respective security key identifiers, identify that a first security key identifier is associated with one or more channels to be used for communications between the base station and the UE, the first security key identifier also associated, via the mapping, with a first security key of the set of security keys, and communicate with the UE using the first security key based on the mapping.

Another base station for wireless communications is described. The base station may include means for transmitting, to a UE, a first control message that includes a mapping of each security key of a set of security keys to respective security key identifiers, means for identifying that a first security key identifier is associated with one or more channels to be used for communications between the base station and the UE, the first security key identifier also associated, via the mapping, with a first security key of the set of security keys, and means for communicating with the UE using the first security key based on the mapping.

A non-transitory computer-readable medium storing code for wireless communications at a base station is described. The code may include instructions executable by a processor to transmit, to a UE, a first control message that includes a mapping of each security key of a set of security keys to respective security key identifiers, identify that a first security key identifier is associated with one or more channels to be used for communications between the base station and the UE, the first security key identifier also associated, via the mapping, with a first security key of the set of security keys, and communicate with the UE using the first security key based on the mapping.

In some examples of the method, base stations, and non-transitory computer-readable medium described herein, transmitting the first control message may include operations, features, means, or instructions for transmitting the first control message that includes a mapping of each security key identifier corresponding to the set of security keys to respective sets of channels.

In some examples of the method, base stations, and non-transitory computer-readable medium described herein, identifying that the first security key identifier may be associated with the one or more channels may include operations, features, means, or instructions for transmitting the second control message that schedules a communication over the one or more channels associated with the first security key identifier, where the base station communicates with the UE over the one or more channels secured with the first security key.

In some examples of the method, base stations, and non-transitory computer-readable medium described herein, transmitting the first control message may include operations, features, means, or instructions for transmitting the first control message that includes the mapping of the first security key identifier to a high priority channel or to a low priority channel.

In some examples of the method, base stations, and non-transitory computer-readable medium described herein, identifying that the first security key identifier may be associated with the one or more channels may include operations, features, means, or instructions for transmitting a second control message that schedules a communication with the UE over one of the high priority channel and the low priority channel, where the base station communicates with the UE over the high priority channel secured using the first security key or over the low priority channel that may be secured using the first security key in accordance with the second control message.

In some examples of the method, base stations, and non-transitory computer-readable medium described herein, identifying that the first security key identifier may be associated with the one or more channels may include operations, features, means, or instructions for transmitting a second control message that indicates that the UE may be to use the first security key corresponding to the first security key identifier for securing the one or more channels, where the base station communicates with the UE over a channel of the one or more channels in accordance with the second control message.

In some examples of the method, base stations, and non-transitory computer-readable medium described herein, transmitting the first control message may include operations, features, means, or instructions for transmitting the first control message that includes the mapping of each security key identifier to respective reference signal resources, where the base station generates each security key of the set of security keys using a respective reference signal resource mapped to each security key identifier.

In some examples of the method, base stations, and non-transitory computer-readable medium described herein, each reference signal resource may be a sounding reference signal resource, a channel state information reference signal resource, or both.

Some examples of the method, base stations, and non-transitory computer-readable medium described herein may further include operations, features, means, or instructions for transmitting a second control message that indicates a new security key and a second security key identifier such that the set of security keys configured at the UE may be updated with the new security key based on the second security key identifier.

In some examples of the method, base stations, and non-transitory computer-readable medium described herein, transmitting the second control message may include operations, features, means, or instructions for transmitting the second control message that includes an indication that the second control message includes the new security key, where the UE updates the set of security keys based on the indication included in the second control message.

In some examples of the method, base stations, and non-transitory computer-readable medium described herein, transmitting the second control message may include operations, features, means, or instructions for transmitting a medium access control layer control element message or a radio resource control message.

In some examples of the method, base stations, and non-transitory computer-readable medium described herein, transmitting the second control message may include operations, features, means, or instructions for transmitting the second control message that may be secured at a higher layer than a layer on which the second control message may be received.

In some examples of the method, base stations, and non-transitory computer-readable medium described herein, transmitting the first control message may include operations, features, means, or instructions for transmitting a radio resource control message that includes the mapping of each security key of the set of security keys to respective security key identifiers.

In some examples of the method, base stations, and non-transitory computer-readable medium described herein, identifying that the first security key identifier may be associated with the one or more channels may include operations, features, means, or instructions for transmitting a downlink control information message or a medium access control layer control element message that indicates the first security key identifier and schedules the one or more channels.

7

Figure 12:
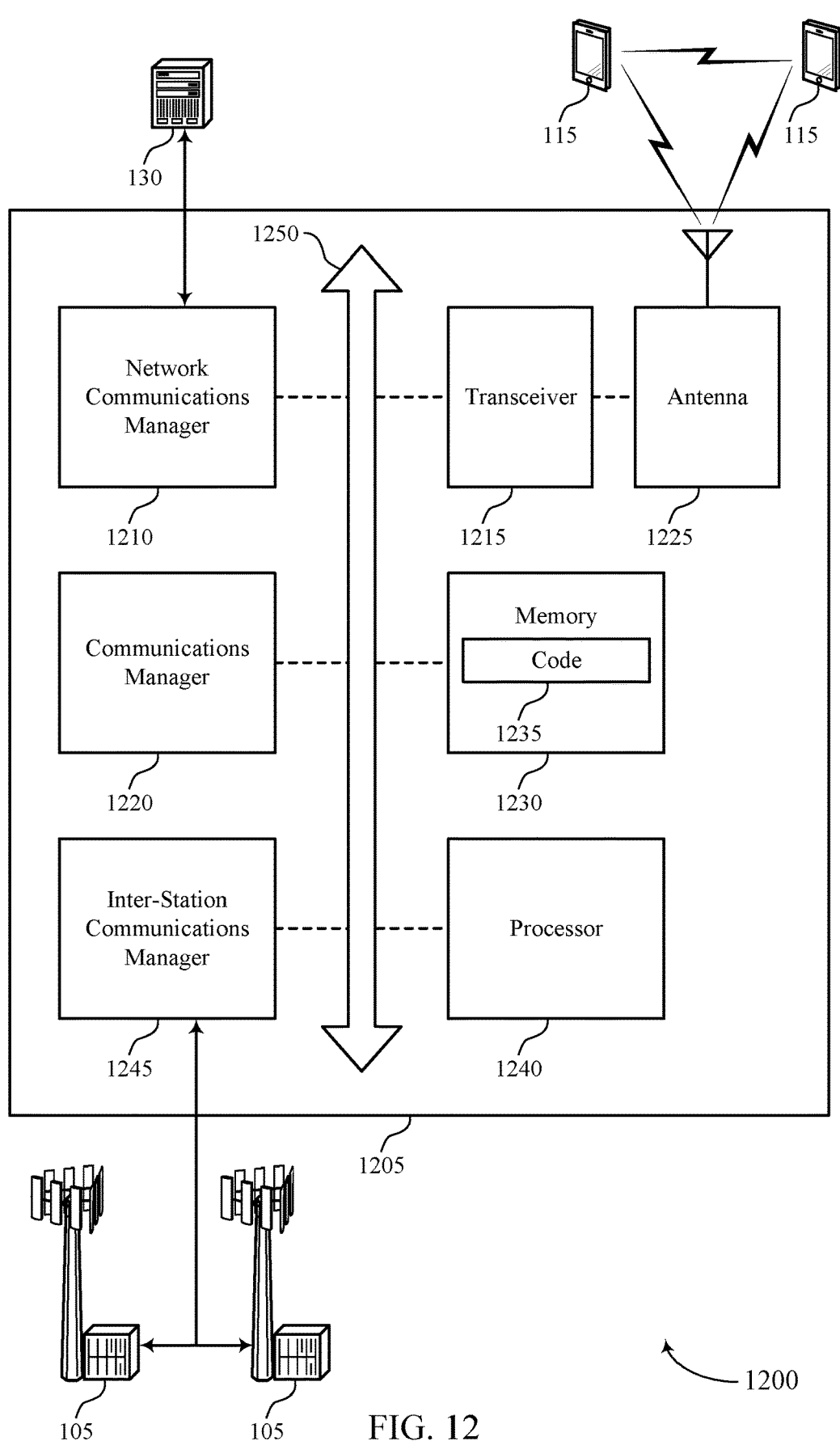

FIG. 12 shows a diagram of a system including a device that supports physical layer secret-key configuration and signaling in accordance with aspects of the present disclosure.

FIGS. 13 through 16 show flowcharts illustrating methods that support physical layer secret-key configuration and signaling in accordance with aspects of the present disclosure.

DETAILED DESCRIPTION

Wireless communications systems may support techniques for securing communications. In some cases, security keys may be used to encrypt or otherwise secure data in transmissions between devices of a wireless communications system. In some wireless communications scenarios, such as internet of things (IoT) scenarios, security is increasingly important due to the number of devices that are connected and communicating with each other. In some wireless communications systems, information may be encrypted at higher layers, but information generated at lower layers may not be encrypted. To improve security in wireless communications systems, information generated at lower layers is secured. Various techniques may be used to generate security keys at the physical (PHY) layer. In some cases, these techniques may be dependent on a position or orientation of the device such as to leverage channel randomness between a transmitter and receiver.

According to some key extraction procedures, the UE and the base station may exchange reference signals and determine a channel metric based on the respective reference signals. The channel metric may be used as a seed to a key derivation function to determine a security key. Because of channel reciprocity between the base station and the UE, each device may determine the same channel metric and thus derive the same security key. The derived security key may be used to secure some fields within a physical channel, such as information in a physical downlink control channel (PDCCH), a physical uplink control channel (PUCCH), physical downlink shared channel (PDSCH), or a physical uplink shared channel (PUSCH).

Techniques described herein support key management at devices in wireless communications system using security key and security key identifier associations. In some examples, a control message may schedule transmissions using one or more physical channels, and the control message may include a field that indicates an identifier for a key that is to be used for securing the transmissions. In other cases, the security key identifiers may be associated with one or more channels (e.g., via control signaling, messaging, transmissions, or communications), and a security key associated with one of the security key identifiers is used for securing a channel based on the channel being scheduled via a control message. In other examples, a resource, such as a channel state information (CSI) reference signal (RS) or a sounding reference signal (SRS) resource, may be associated with a security key identifier, and the corresponding keys are generated using the resources. The key identifiers may also be used to support key updates and modifications. These and other techniques are described in further detail with respect to the figures.

Aspects of the disclosure are initially described in the context of wireless communications systems. Aspects of the disclosure are further described with respect to wireless communications systems using the security key identifier techniques described herein. Aspects of the disclosure are further illustrated by and described with reference to a process flow diagram, apparatus diagrams, system diagrams, and flowcharts that relate to physical layer secret-key configuration and signaling.

Figure 1:
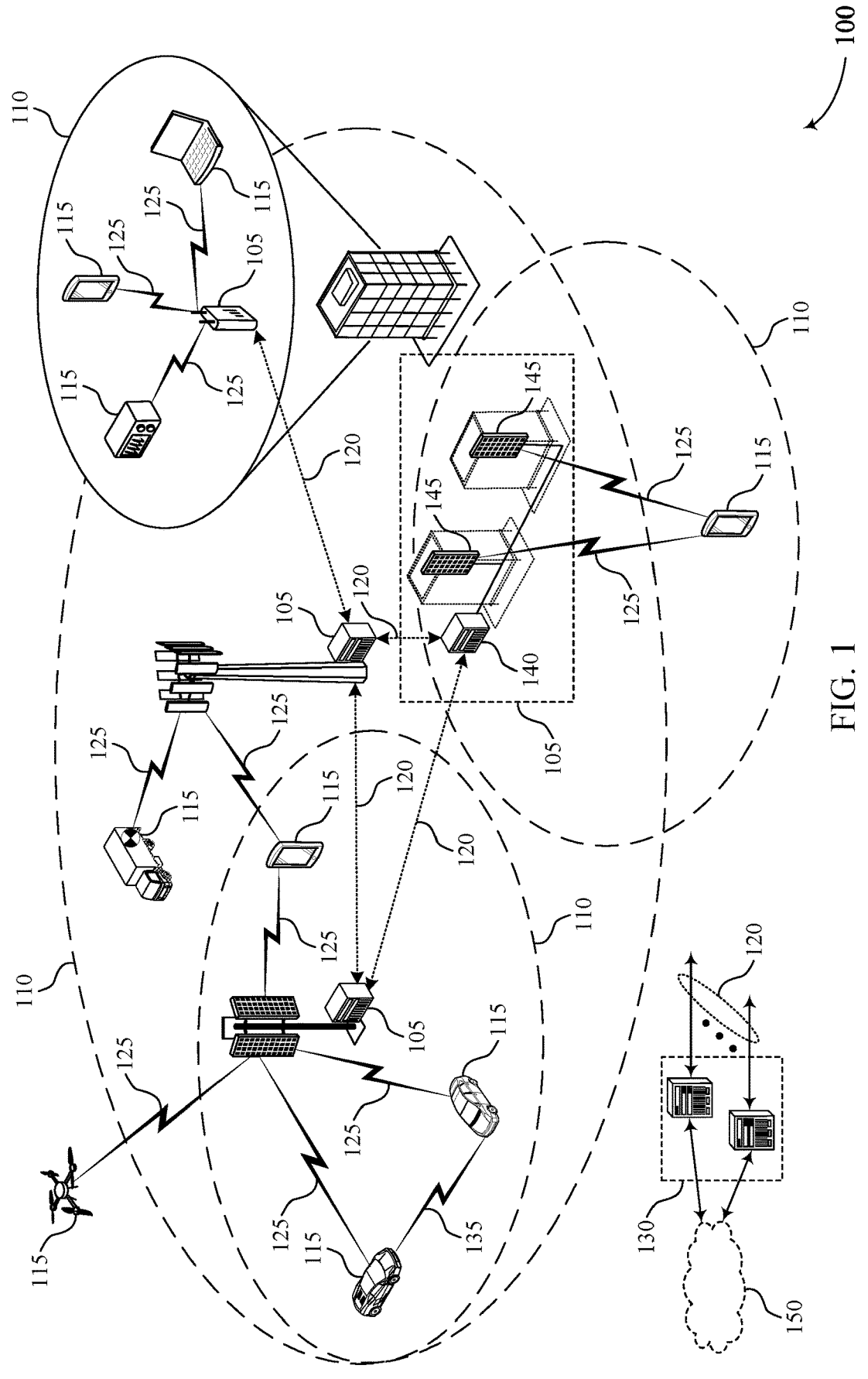
FIG. 1 illustrates an example of a wireless communications system that supports physical layer secret-key configuration and signaling in accordance with aspects of the present disclosure.

FIG. 1 illustrates an example of a wireless communications system 100 that supports physical layer secret-key configuration and signaling in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1: M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications system 100 may support physical layer security schemes between a base station 105 and UEs 115 and/or between UEs 115. In some cases, these physical layer security schemes may rely on the position of the UE 115 relative to the base station 105 to derive security keys that are used to secure communications. As the position of the UE 115 relative to the base station 105 may impact various channel characteristics, the use of channel estimation to determine security keys may improve security within the wireless communications system 100. That is, various UEs 115 may have different channel characteristics due to differences in position relative to a particular base station 105, and as a result, the use of channel characteristics may support improved security in the wireless communications system 100.

According to some security key extraction procedures, two devices, such as a base station 105 and a UE 115, may exchange reference signals. Each device (e.g., the base station 105 and the UE 115) may estimate its channel based on the received reference signal and obtain a metric based on the channel (e.g., channel power, reference signal received power (RSRP), signal interference to noise ratio, phase). The obtained metric may be quantized and mapped to a value that is used as a security key or used to derive a security key. Thus, due to channel reciprocity, the security key may be obtained by both devices. At high signal to noise environments, these techniques may be secured, or the repetition of pilot signals or other key refinement procedures may be used. The security key may be used by the base station 105 and the UE 115 to secure communications, such as by securing fields within a physical channel (e.g., information in a PDCCH, PUCCH, PDSCH, and/or PUSCH).

Techniques described herein support management of physical layer security keys using key identifiers. A set of security keys that are configured at a UE 115 may be indicated, modified, and used using the security key identifiers. For example, a base station 105-*a* may transmit, to the UE 115, a first control message that includes a mapping of security keys to respective security key identifiers. The first control message may be an example of a RRC or a medium access control layer control element (MAC-CE) message. The UE 115 may identify that a first security key identifier is associated with one or more channels to be used for communications between the UE 115 and the base station 105. In some examples, the identification is based on a mapping or an indication of a key identifier by a scheduling message (e.g., downlink control information (DCI) message) that schedules communications on the channel. In some cases, the key identifiers are associated with reference signal resources, and the keys generated using such resources are thereby associated with the identifiers. The identifiers may also be indicated in control signaling that is used to change or update a key. Accordingly, the techniques described herein may support efficient physical layer security key management, thereby promoting enhanced security in the wireless communications system 100.

Figure 2:
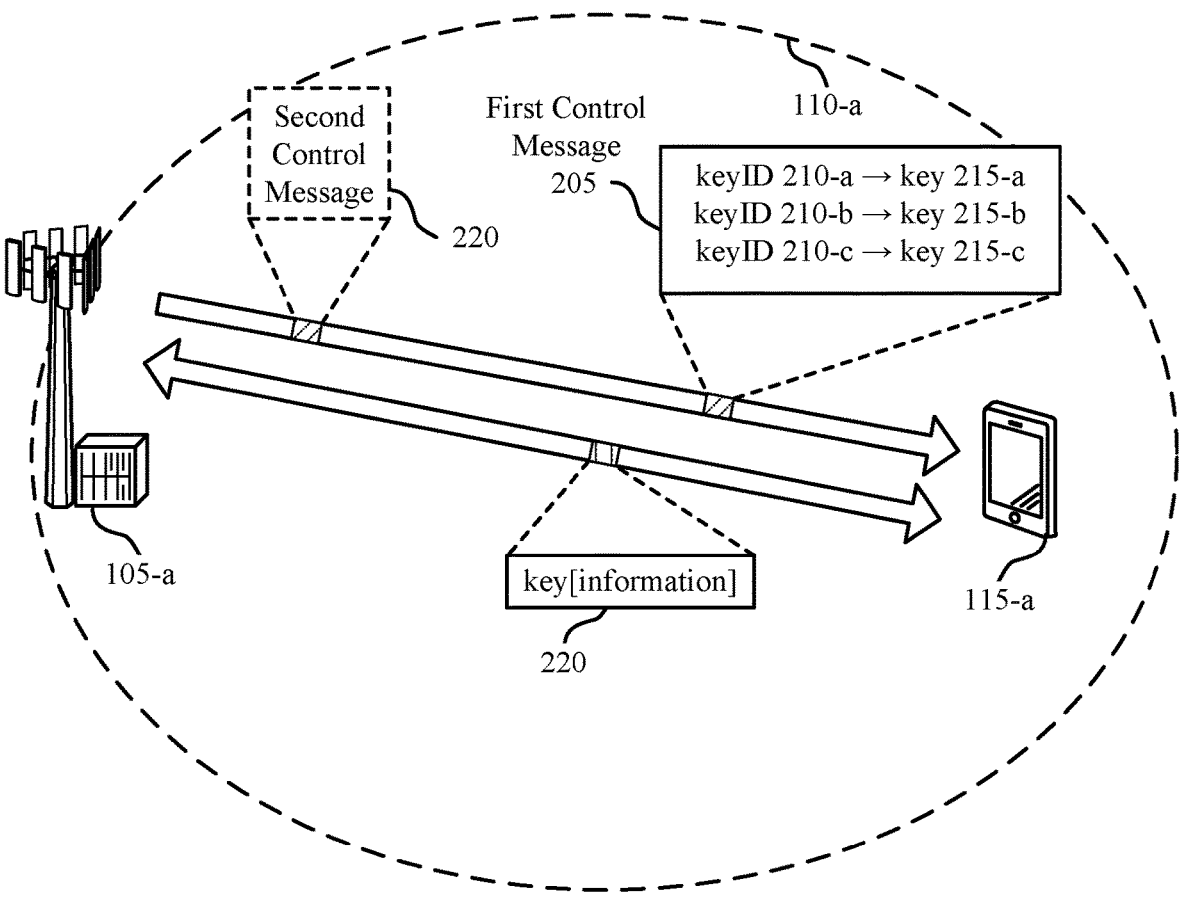
FIG. 2 illustrates an example of a wireless communications system that supports physical layer secret-key configuration and signaling in accordance with aspects of the present disclosure.

FIG. 2 illustrates an example of a wireless communications system 200 that supports physical layer secret-key configuration and signaling in accordance with aspects of the present disclosure. The wireless communications system 200 includes a base station 105-*a* and a UE 115-*a*, which may be examples of the corresponding devices of wireless communications system 100 of FIG. 1. Various aspects of techniques described with respect to FIG. 2 may be performed by devices other than base station 105-*a* and UE 115-*a*. For example, various aspects of the techniques described herein may be performed by two UEs 115 in a sidelink communication scenario.

Base station 105-*a* may communicate with UE 115-*a* that is positioned within a coverage area 110-*a* of the base station 105-*a* according to techniques described herein. For example, base station 105-*a* and UE 115-*a* may use the techniques described herein to manage a set of security keys that may be used to secure various communications between the UE 115-*a* and the base station 105-*a*. In some cases, the security key may be used to secure information communicated using resources of a PDCCH, PDSCH, PUSCH, or a PUCCH. The UE 115-*a* and the base station 105-*a* may use higher layer security schemes and physical layer security schemes. For example, the physical layer security schemes may use channel characteristics to derive security keys that may be used to secure various channels (e.g., NR control channels) and messages, such an uplink control information (UCI) messages and downlink control information (DCI) messages. Securing the control messages (e.g., UCI and DCI) may make it difficult for the eavesdroppers to perform decoding and disturb activities that may secure the system. Thus, these physical layer security schemes may be used in addition to the upper layer security schemes to further secure the wireless communications system 100. In some cases, keys may be extracted by an upper layer and used to secure information generated at the PHY layer.

Techniques described herein support key management of physical layer security keys using key identifiers. For example, a security key identifier may be used to indicate a change in a security key, an indication to use a particular key to secure a physical channel, and to update the security key by using CSI-RS/SRS resource configured by the key identifier. For example, if the resource used for generating a secret key are triggered, then the security key associated with the identifier may be updated based on those resources. Thus, techniques described herein support utilization of security key identifiers, configuration of the reference signals used for security key derivation, and key signaling (e.g., communication or transmission of the key) using RRC messaging, which may be layer 3 (L3) secured.

Each security key 215 that may be agreed between the UE 115-*a* and the base station 105-*a* (or any other two devices) may be associated with a security key identifier 210. Further, any update or information related to the security key 215 may be communicated using the security key identifier 210. To support security key 215 and security key identifier 210 association, the base station 105-*a* may configure the set of security keys 215 for a physical channel or a group of physical channels, and each security key 215 in the set may be associated with a security key identifier 210. For example, the base station 105-*a* may transmit a first control message 205 (e.g., RRC message or MAC-CE message) that includes a mapping of each security key 215 of a set of security keys to a security key identifier 210. In some cases, the security keys (e.g., the values for the security keys) are not communicated in the first control message 205, but are generated by the UE 115-*a* and associated with the respective security key identifier 210 via the first control message 205. The first control message 205 may map a security key that is to be generated a particular resource (e.g., time or frequency resource), by the UE 115-*a*, to a security key identifier 210. For example, the first control message 205 may map a SRS and/or a CSI-RS resource to a particular security key identifier 210, and when the UE 115-*a* generates the security key using the SRS and/or CSI-RS resource (using physical layer security key generation procedures), the security key is associated with the corresponding security key identifier 210.

In some examples, the first control message 205 may include a mapping of security key identifiers to physical channels. For example, the first control message 205 may map security key identifier 210-*a* to a PDCCH, security key identifier 210-*b*, to a PDSCH, security key identifier 210-*c* to a PUCCH, and another security identifier to a PUSCH. In such cases, each time one of the physical channels is used for communications, then the information may be encoded using the corresponding security key 215.

Additionally or alternatively, the network (e.g., base station 105-*a*) may indicate the security key identifier 210 that is to be used for securing information on a channel. For example, a second control message 220, which may be an example of a DCI message or MAC-CE message, may include a field that indicates a security key identifier 210 corresponding to a security key 215 that is to be used for a channel or a group of channels. In some examples, as described above, various security keys 215 may be mapped to physical channel. In such cases, the second control message 220 may schedule one of the channels, which may implicitly indicate that the UE 115-*a* is to secure information in the channel using the security key 215 associated with the security key identifier 210 mapped to the scheduled channel. In some cases, the security key identifier 210 may be implicitly indicated by associating the security key identifier 210 to a channel priority. For example, the security key set may contain two security keys. A first security key of the set may be associated with a high priority channel, and a second security key 215 of the set may be associated with a low priority channel. The association (e.g., association of security key identifiers 210-*a* to channel priorities) may be configured via control messaging (e.g., the first control message 205). Thus, when a high or low priority channel is scheduled (e.g., via second control message 220 (DCI)), then the UE 115-*b* may determine that the corresponding security key 215 is to be used for securing the channel.

As described herein, the security key identifiers 210-*a* and security key 215 associations may be configured via resources. That is, when a security key generation procedure is performed via channel sounding (e.g., based on channel reciprocity and randomness), the base station 105-*a* may configure (e.g., using the first control message 205) the security key identifiers 210 as part of the sounding resource configuration. Example sounding resources may include SRS and CSI-RS for Uu links and SL CSI-RS and SRS resources for security key generation in sidelink communications (e.g., between UEs 115). In some cases, the UE 115-*a* may be configured with multiple sounding resources to generate multiple keys. The associated between security key identifier 210 and the sounding resource may provide a common configuration of security key identifiers 210 and security keys 215 between the UE 115-*a* and the base station 105-*a*. Thus, upon configuration of the sounding resource or resource sets that are to be used for secret key generation (e.g., derivation or extraction), the network (e.g., base station 105-*a*) may provide or indicate the security key identifiers 210 for the resources.

As described herein, various techniques may be used to configure security key identifier 210 and security key 215 mappings. Further, various techniques may be used to indicate a security key 215 that is to be used to secure a channel. As illustrated at 220, a security key may be used to secure information in a channel. The information may be information included in one or more fields of a message, such as UCI, DCI, SCI, information included in a PDSCH or PUSCH, a PSSCH, etc. Securing the information may include encrypting or encoding the information using the security key 215 associated with a security key identifier 210. In some cases, a security key 215 associated with a security key identifier 210 may be changed, modified, or updated. A key may be changed, modified, or updated based on various conditions or parameters such as an expiration time or a key being compromised. In such cases, the techniques described with respect to FIG. 3 may be used for updating the key.

Figure 3:
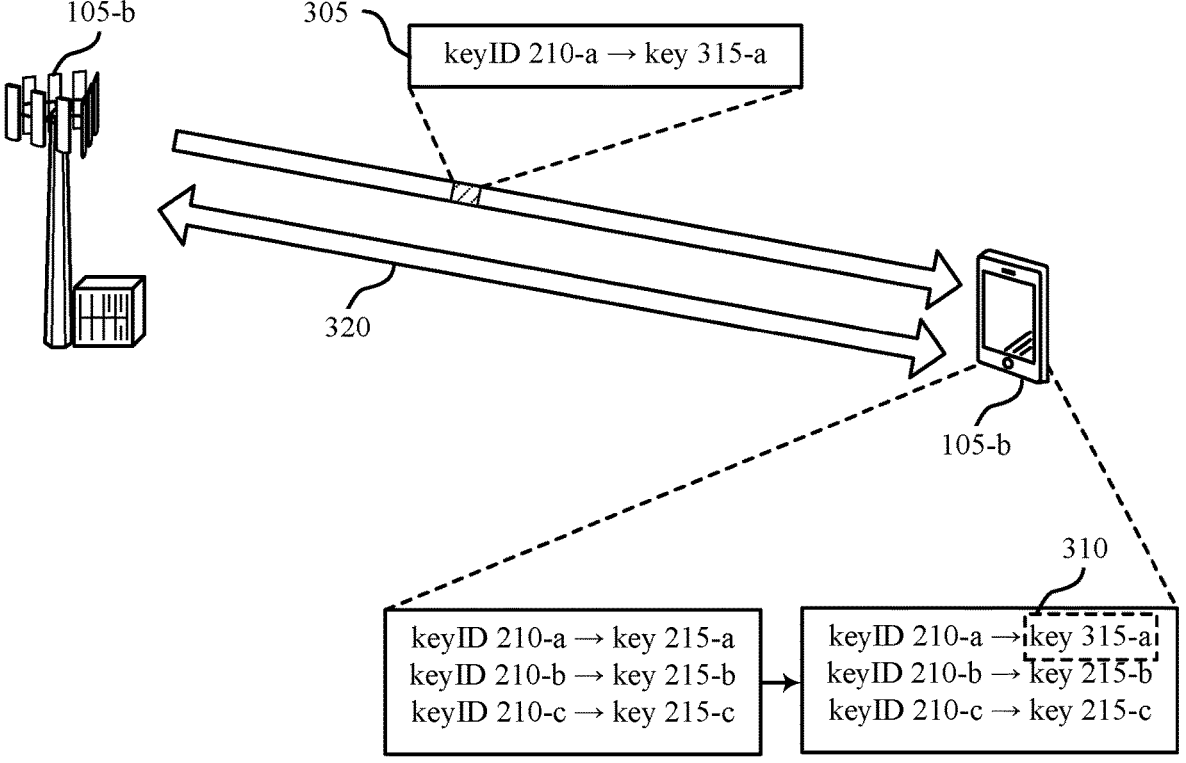
FIG. 3 illustrates an example of a wireless communications system that supports physical layer secret-key configuration and signaling in accordance with aspects of the present disclosure.

FIG. 3 illustrates an example of a wireless communications system 300 that supports physical layer secret-key configuration and signaling in accordance with aspects of the present disclosure. The wireless communications system 300 includes a base station 105-*b* and a UE 115-*b*, which may be examples of the corresponding devices of wireless communications system 100 of FIG. 1 and wireless communications system 200 of FIG. 2. Various aspects of techniques described with respect to FIG. 3 may be performed by devices other than base station 105-*b* and UE 115-*b*. For example, various aspects of the techniques described herein may be performed by two UEs 115 in a sidelink communication scenario.

Base station 105-*b* may communicate with UE 115-*b* using communications that are secured according to a security key. Additionally, the base station 105-*b* may configure mappings of security keys and security key identifiers as described with respect to FIG. 2. For example, the base station 105-*b* may transmit, to the UE 115-*b*, a first control message that includes a mapping of each security key 215 to a security key identifier 210. The UE 105-*b* may identify that a first security key identifier 210-*a* is associated with one or more channels (e.g., a channel 320) to be used for communications between the UE 115-*b* and the base station 105-*b*. The first security key identifier 210-*a* is associated with a first security key 215-*a* (e.g., via the mapping indicated in the first control message) of the set of security keys 215. The UE 115-*b* may identify that the first security key identifier 210-*a* is associated with the one or more channels based on an explicit indication (e.g., a DCI that schedules the channel and includes a field with the first security key identifier 210-*a*) or via an implicit indication. For an implicit indication, the first security key identifier 210-*a* may be mapped to a scheduled channel via control messaging. The channel may be a particular channel that is mapped to the security key identifier 210-*a* or may be a channel of a priority that is mapped to the security key identifier 210-*a*. Thus, when the channel or channel priority that is associated with the first security key identifier 210-*a* is scheduled, the scheduling may function as an implicit indication that the UE 115-*b* is to use the corresponding security key 215-*a* to secure information in the channel.

In some cases, the base station 105-*b* may add a new security key 215 or update a security key 215 configured at the UE 105-*b*. Since the UE 115-*b* is in a RRC_CONNECTED state with the base station 105-*b* and the RRC signaling may be secured using L3 techniques, the base station 105-*b* may signal the new or updated security key 215 associated with a security key identifier 210 using RRC signaling. For example, the base station 105-*b* transmit a control message 305 that includes the security key identifier 210-*a* and the new bits of the new security key 315-*a*. In some examples, the control message 305 may include an indication of the physical channel that is to be secured by the new security key 315-*a*. Additionally or alternatively, the control message 305 (e.g., RRC message) may include a flag that indicates that the control message 305 includes the new security key 315-*a*. The flag may be a new key indicator flag.

In some cases, MAC-CE messaging may be secured with layer 2 (L2) security techniques. In such cases, a security key may be signaled (e.g., a new or updated security key 315-*a*) via MAC-CE. As such, the control message 305 may be an example of a MAC-CE message that includes the new security key 315-*a*, the security key identifier 210-*a*, and/or a new key indicator flag When a new or updated key is signaled by the control message 305, the UE 115-*b* may update the indicated security key identifier 210-*a* with the new security key 315-*a* as shown at 310. Thus, the mapping indicated via the control messaging as described with respect to FIG. 2 may be updated with the new security key 315-*a*. As the control message 305 is secured via L2 or L3 schemes, the new security key 315-*a* may be communicated in a secure manner.

Figure 4:
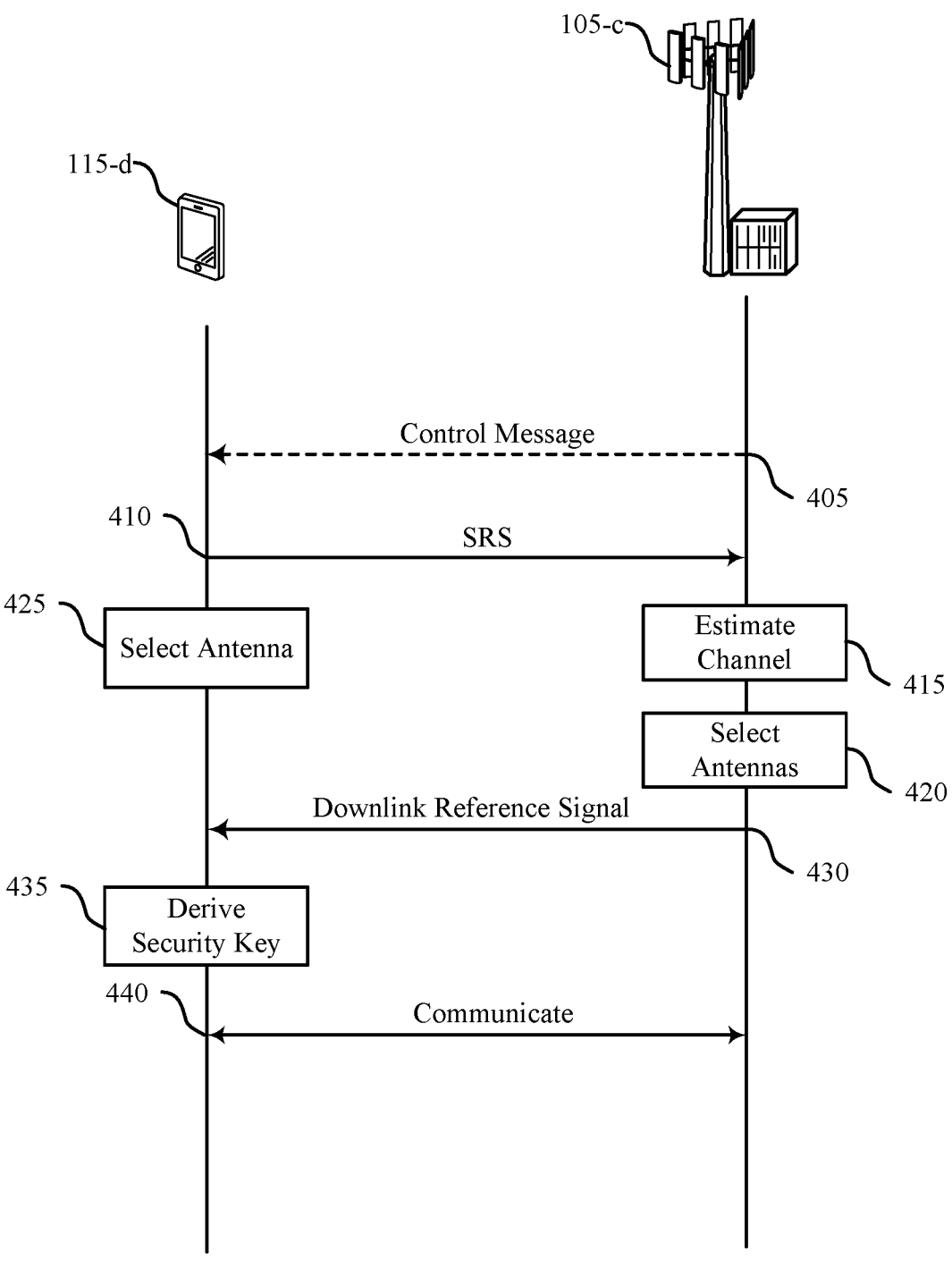
FIG. 4 illustrates an example of a process flow that supports physical layer secret-key configuration and signaling in accordance with aspects of the present disclosure.

FIG. 4 illustrates an example of a process flow 400 that supports physical layer secret-key configuration and signaling in accordance with aspects of the present disclosure. In some examples, process flow 400 may implement aspects of wireless communications systems 100, 200, and 300 as described with reference to FIGS. 1 through 3. Process flow 400 may include base station 105-*c* and UE 115-*c*, which may be examples of the corresponding devices described with respect to FIGS. 1 through 3. The process flow 400 may represent aspects of techniques performed by wireless devices as described with reference to FIGS. 1 through 3.

The process flow 400 illustrates an exemplary order of actions performed by base station 105-*c* and UE 115-*c* to support secure communications. In the following description of the process flow 400, the operations between base station 105-*c* and UE 115-*c* may be transmitted in a different order than the exemplary order shown, or the operations performed by base station 105-*c* and UE 115-*c* may be performed in different orders or at different times. Certain operations may also be omitted from the process flow 400, and/or other operations may be added to the process flow 400.

A wireless communication system containing one or more devices may include multiple devices communicating with the other. For example, a wireless communication system may contain two devices (e.g., UE-base station or UE-UE) which may utilize the process flow 400 to establish secure communications. In some examples, a system of multiple wireless devices may exchange or extract some secret keys from an upper layer or PHY layer to use to secure transmitted messages, allowing only some devices within a network to interpret secure messages. The security keys may be extracted using PHY layer security key generation techniques or may be indicated via upper layers.

At 405, the base station 105-*c* may transmit, to the UE 115-*c*, and the UE 115-*c* may receive, a first control message that includes a mapping of each security key of a set of security keys to respective security key identifiers. The first control message may be an example of a RRC message, a MAC-CE message, or a combination thereof. In some cases, the first control message includes a mapping of each security key identifier corresponding to the set of security keys to respective sets of channels. In some cases, the first control message includes the mapping of the first security key identifier to a high priority channel or to a low priority channel. In some examples, the first control message includes a mapping of each security key identifier to respective reference signal resources. In such cases, the security key that is generated using the reference signal resources is associated with the corresponding security key identifier in accordance with the mapping.

At 410, the UE 115-*c* may receive, from the base station 105 a second control message that schedules a communication over the one or more channels that are associated with a first security key identifier. In some examples, the second control message may schedule a communication over one of the high priority channel and the low priority channel that is mapped to the first security key identifier by the first control message. In some cases, the second control message includes an explicit indication of the first security key identifier associated with the first security key that the base station 105-*c* and the UE 115-*c* are to use for securing a channel (e.g., a channel scheduled by the second control message).

At 415, the UE 115-*c* may identify that the first security key identifier is associated with one or more channels to be used for communications between the UE and the base station. The first security key identifier is also associated, via the mapping indicated by the first control message, with the first security key of the set of security keys. The UE 115-*c* may identify that the first security key identifier is associated with the one or more channels based on the second control message. As described herein, the second control message may schedule a communication over a channel that is associated, via the first control message, with the first security key identifier. For example, the second control message may schedule a high priority or low priority channel, and the UE 115-*c* may identify that the corresponding security key identifier is associated with the scheduled channel based on the mapping indicated in the first control message.

At 420, the UE 115-*c* may communicate with the base station 105-*b* using the first security key based at least in part on the mapping. In some cases, the communicating may include securing (e.g., encoding or encrypting) various fields of transmissions using the security key.

At 425, the UE 115-*c* may receive, from the base station 105-*c*, a third control message that indicates a new security key and a second security key identifier. The third control message may be an example of a MAC-CE message or DCI message. The third control message may include a new key flag, a value for the new key, and an indication of the security key identifier. The security key identifier may correspond to a key configured at the UE 115-*c* that is to be updated or to a new security key that is to be added to a set of security keys configured at the UE 115-*c*.

At 430, the UE 115-*c* may update the set of security keys to include the new security key using the second security key identifier. Updating may include replacing a prior key associated with the second security key identifier with the new security key. In other cases, updating may include adding the security key identifier and the new security key to the set of security keys.

Figure 5:
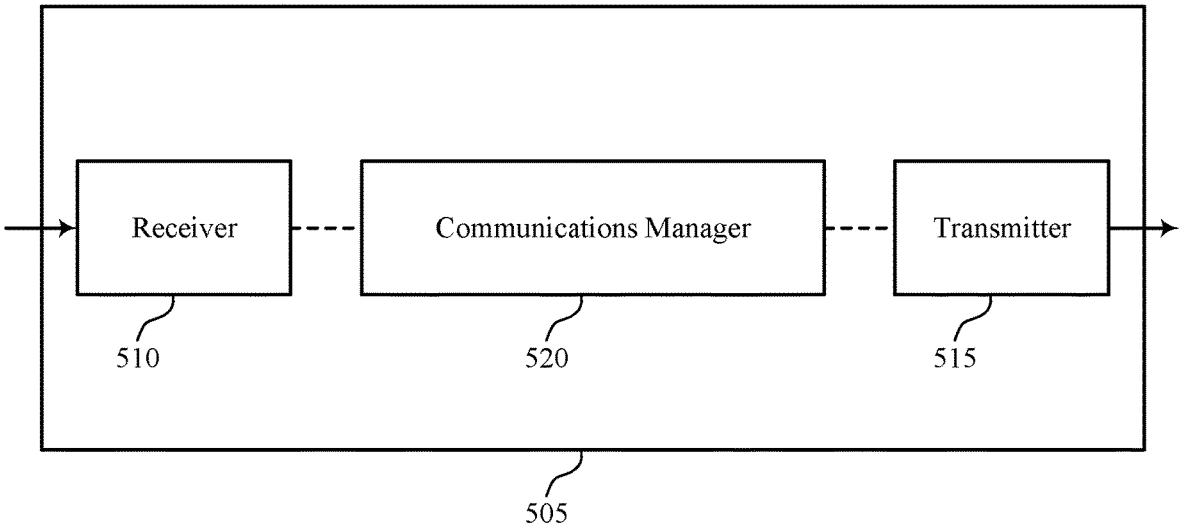
FIGS. 5 and 6 show block diagrams of devices that support physical layer secret-key configuration and signaling in accordance with aspects of the present disclosure.

FIG. 5 shows a block diagram 500 of a device 505 that supports physical layer secret-key configuration and signaling in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to physical layer secret-key configuration and signaling). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to physical layer secret-key configuration and signaling). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of physical layer secret-key configuration and signaling as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. For example, the communications manager 520 may be configured as or otherwise support a means for receiving, from a base station, a first control message that includes a mapping of each security key of a set of security keys to respective security key identifiers. The communications manager 520 may be configured as or otherwise support a means for identifying that a first security key identifier is associated with one or more channels to be used for communications between the UE and the base station, the first security key identifier also associated, via the mapping, with a first security key of the set of security keys. The communications manager 520 may be configured as or otherwise support a means for communicating with the base station using the first security key based on the mapping.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced processing by supporting efficient key identification for securing communications and key management.

Figure 6:
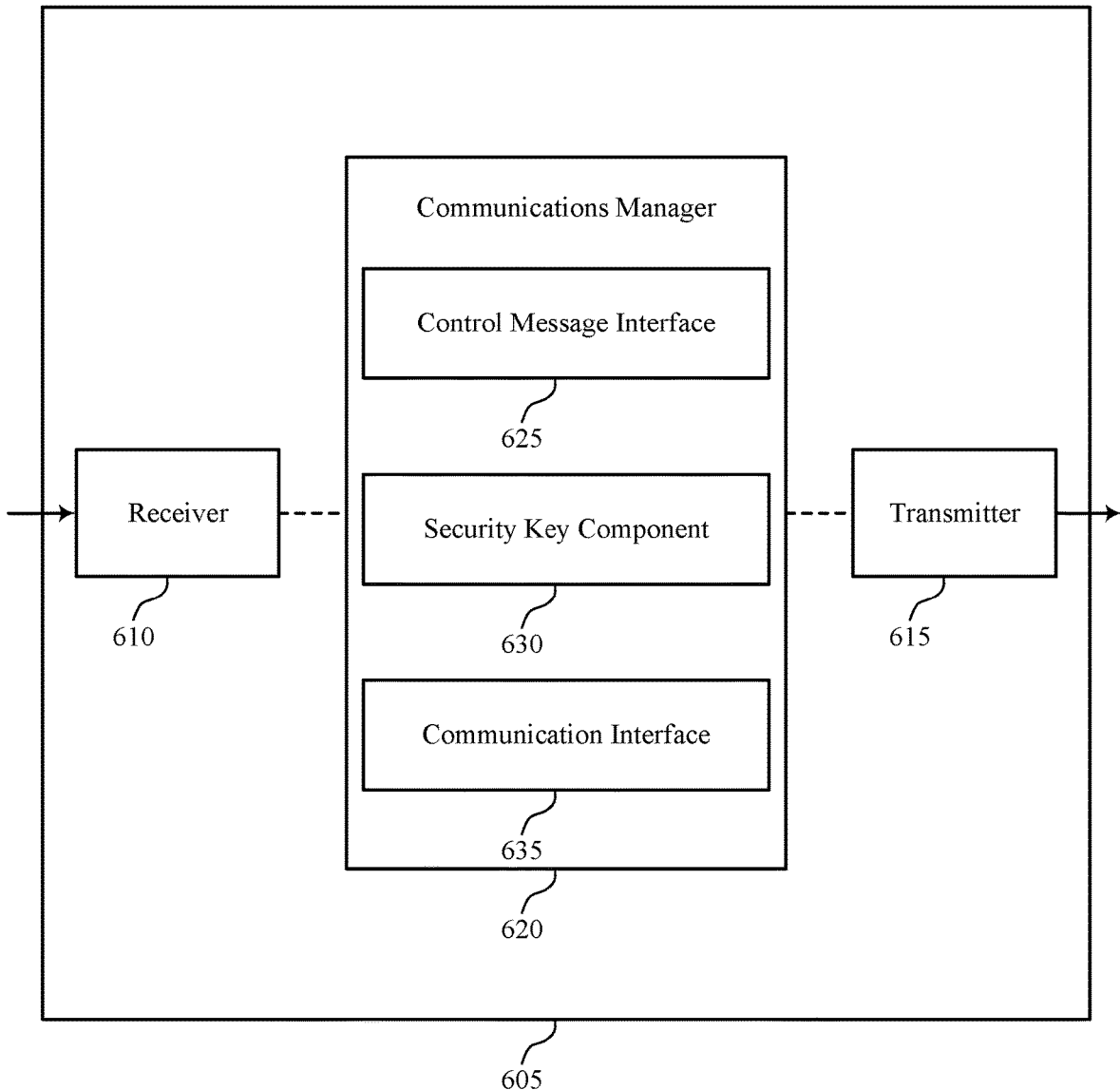

FIG. 6 shows a block diagram 600 of a device 605 that supports physical layer secret-key configuration and signaling in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to physical layer secret-key configuration and signaling). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to physical layer secret-key configuration and signaling). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of physical layer secret-key configuration and signaling as described herein. For example, the communications manager 620 may include a control message interface 625, a security key component 630, a communication interface 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The control message interface 625 may be configured as or otherwise support a means for receiving, from a base station, a first control message that includes a mapping of each security key of a set of security keys to respective security key identifiers. The security key component 630 may be configured as or otherwise support a means for identifying that a first security key identifier is associated with one or more channels to be used for communications between the UE and the base station, the first security key identifier also associated, via the mapping, with a first security key of the set of security keys. The communication interface 635 may be configured as or otherwise support a means for communicating with the base station using the first security key based on the mapping.

Figure 7:
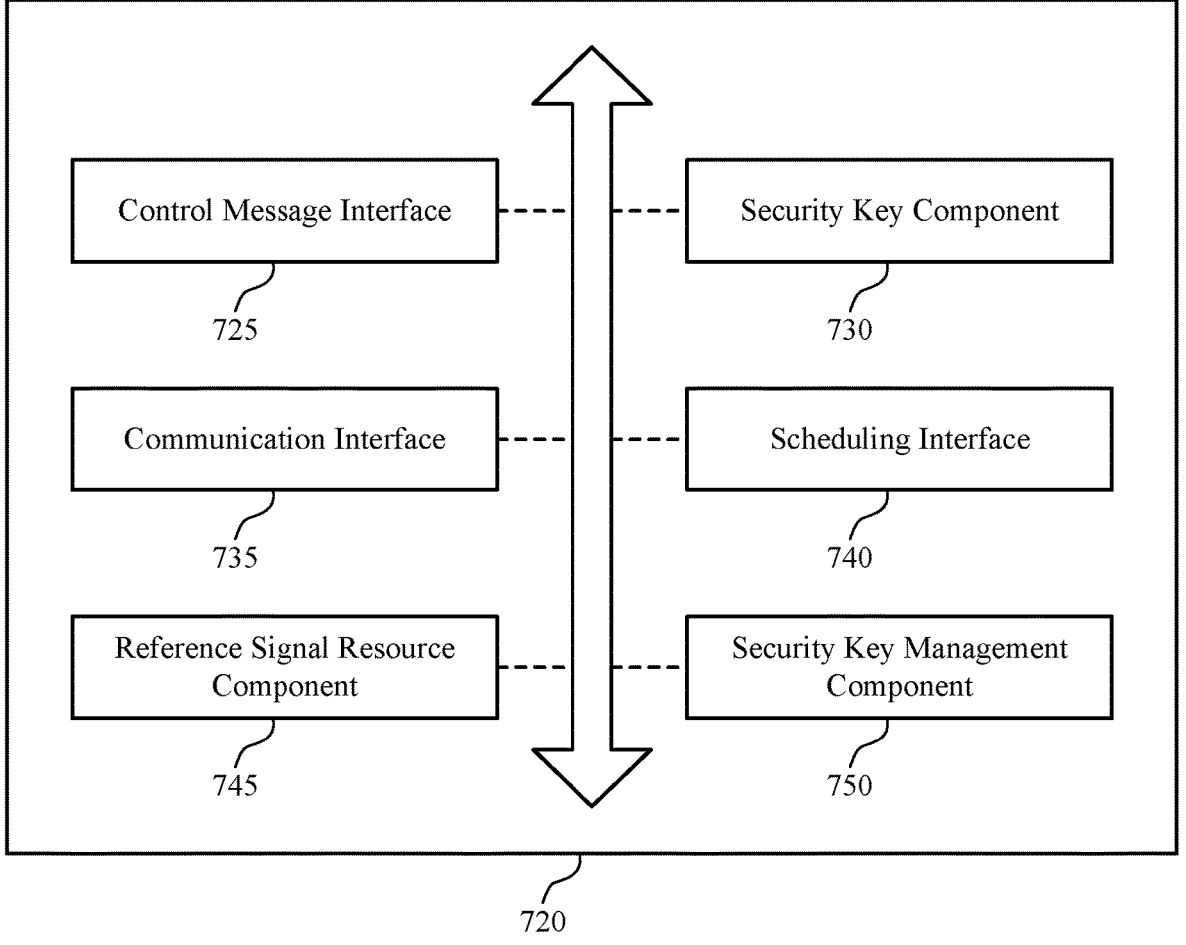
FIG. 7 shows a block diagram of a communications manager that supports physical layer secret-key configuration and signaling in accordance with aspects of the present disclosure.

FIG. 7 shows a block diagram 700 of a communications manager 720 that supports physical layer secret-key configuration and signaling in accordance with aspects of the present disclosure. The communications manager 720 may be an example of aspects of a communications manager 520, a communications manager 620, or both, as described herein. The communications manager 720, or various components thereof, may be an example of means for performing various aspects of physical layer secret-key configuration and signaling as described herein. For example, the communications manager 720 may include a control message interface 725, a security key component 730, a communication interface 735, a scheduling interface 740, a reference signal resource component 745, a security key management component 750, or any combination thereof.

Each of these components may communicate, directly or indirectly, with one another (e.g., via one or more buses).

The communications manager 720 may support wireless communication at a UE in accordance with examples as disclosed herein. The control message interface 725 may be configured as or otherwise support a means for receiving, from a base station, a first control message that includes a mapping of each security key of a set of security keys to respective security key identifiers. The security key component 730 may be configured as or otherwise support a means for identifying that a first security key identifier is associated with one or more channels to be used for communications between the UE and the base station, the first security key identifier also associated, via the mapping, with a first security key of the set of security keys. The communication interface 735 may be configured as or otherwise support a means for communicating with the base station using the first security key based on the mapping.

In some examples, to support receiving the first control message, the control message interface 725 may be configured as or otherwise support a means for receiving the first control message that includes a mapping of each security key identifier corresponding to the set of security keys to respective sets of channels.

In some examples, to support identifying that the first security key identifier is associated with the one or more channels, the scheduling interface 740 may be configured as or otherwise support a means for receiving a second control message that schedules a communication over the one or more channels that are associated with the first security key identifier, where the UE communicates with the base station over the one or more channels that are secured by the first security key.

In some examples, to support receiving the first control message, the control message interface 725 may be configured as or otherwise support a means for receiving the first control message that includes the mapping of the first security key identifier to a high priority channel or to a low priority channel.

In some examples, to support identifying that the first security key identifier is associated with the one or more channels, the scheduling interface 740 may be configured as or otherwise support a means for receiving a second control message that schedules a communication over one of the high priority channel and the low priority channel that is mapped to the first security key identifier by the first control message, where the UE communicates with the base station over the high priority channel secured using the first security key or over the low priority channel that is secured using the first security key in accordance with the second control message.

In some examples, to support identifying that the first security key identifier is associated with the one or more channels, the scheduling interface 740 may be configured as or otherwise support a means for receiving a second control message that indicates that the UE is to use the first security key corresponding to the first security key identifier for securing the one or more channels scheduled by the second control message, where the UE communicates with the base station over a channel of the one or more channels in accordance with the second control message.

In some examples, to support receiving the first control message, the reference signal resource component 745 may be configured as or otherwise support a means for receiving the first control message that includes the mapping of each security key identifier to respective reference signal resources, where the UE generates each security key of the set of security keys using a respective reference signal resource mapped to each security key identifier.

In some examples, each reference signal resource is a sounding reference signal resource, a channel state information reference signal resource, or both.

In some examples, the control message interface 725 may be configured as or otherwise support a means for receiving a second control message that indicates a new security key and a second security key identifier. In some examples, the security key management component 750 may be configured as or otherwise support a means for updating the set of security keys to include the new security key using the second security key identifier.

In some examples, to support receiving the second control message, the control message interface 725 may be configured as or otherwise support a means for receiving the second control message that includes an indication that the second control message includes the new security key, where the set of security keys is updated based on the indication in the second control message.

In some examples, to support receiving the second control message, the control message interface 725 may be configured as or otherwise support a means for receiving a medium access control layer control element message or a radio resource control message.

In some examples, to support receiving the second control message, the control message interface 725 may be configured as or otherwise support a means for receiving the second control message that is secured at a higher layer than a layer on which the second control message is received.

In some examples, to support receiving the first control message, the control message interface 725 may be configured as or otherwise support a means for receiving a radio resource control message that includes the mapping of each security key of the set of security keys to respective security key identifiers.

In some examples, to support identifying that the first security key identifier is associated with the one or more channels, the control message interface 725 may be configured as or otherwise support a means for receiving a downlink control information message or a medium access control layer control element message that indicates the first security key identifier and schedules the one or more channels.

Figure 8:
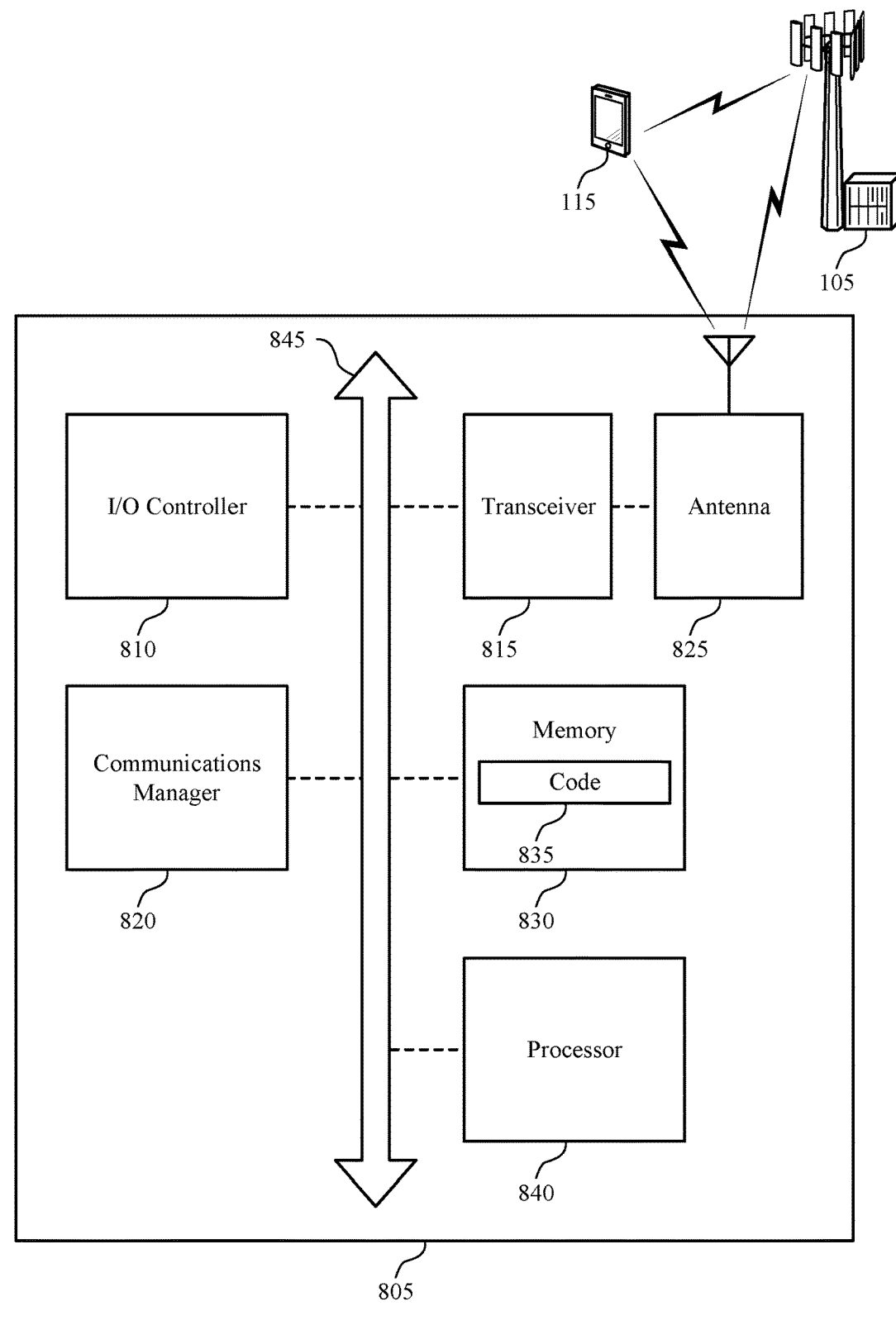
FIG. 8 shows a diagram of a system including a device that supports physical layer secret-key configuration and signaling in accordance with aspects of the present disclosure.

FIG. 8 shows a diagram of a system 800 including a device 805 that supports physical layer secret-key configuration and signaling in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting physical layer secret-key configuration and signaling). For example, the device 805 or a component of the device 805 may include a processor 840 and memory 830 coupled to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for receiving, from a base station, a first control message that includes a mapping of each security key of a set of security keys to respective security key identifiers. The communications manager 820 may be configured as or otherwise support a means for identifying that a first security key identifier is associated with one or more channels to be used for communications between the UE and the base station, the first security key identifier also associated, via the mapping, with a first security key of the set of security keys. The communications manager 820 may be configured as or otherwise support a means for communicating with the base station using the first security key based on the mapping.

By including or configuring the communications manager 820 in accordance with examples as described herein, the device 805 may support techniques for improved security in a wireless communications system by supporting efficient use of security keys and security key management using key identifiers.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of physical layer secret-key configuration and signaling as described herein, or the processor 840 and the memory 830 may be otherwise configured to perform or support such operations.

Figure 9:
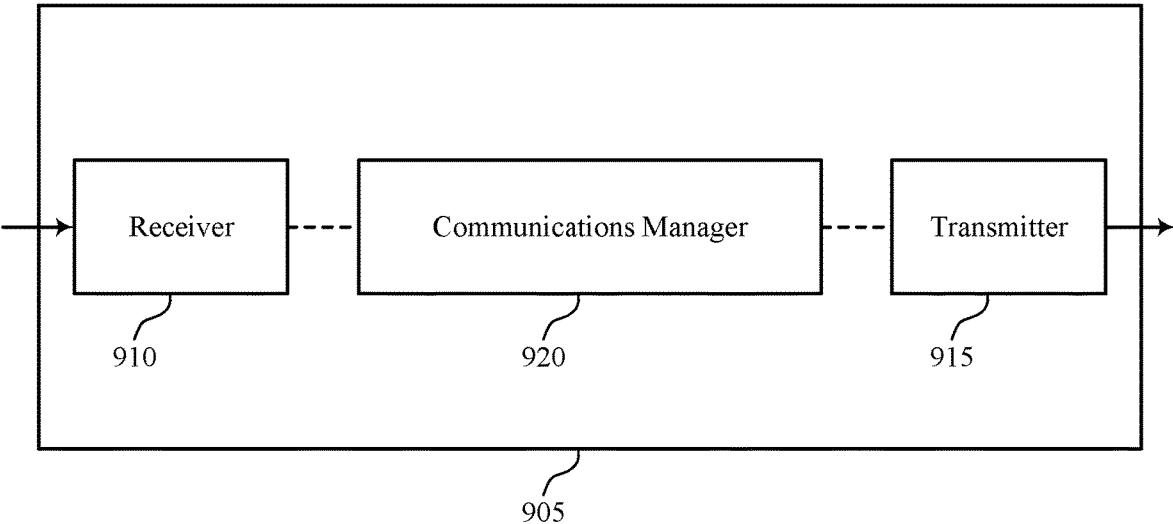
FIGS. 9 and 10 show block diagrams of devices that support physical layer secret-key configuration and signaling in accordance with aspects of the present disclosure.

FIG. 9 shows a block diagram 900 of a device 905 that supports physical layer secret-key configuration and signaling in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to physical layer secret-key configuration and signaling). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to physical layer secret-key configuration and signaling). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of physical layer secret-key configuration and signaling as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a base station in accordance with examples as disclosed herein. For example, the communications manager 920 may be configured as or otherwise support a means for transmitting, to a UE, a first control message that includes a mapping of each security key of a set of security keys to respective security key identifiers. The communications manager 920 may be configured as or otherwise support a means for identifying that a first security key identifier is associated with one or more channels to be used for communications between the base station and the UE, the first security key identifier also associated, via the mapping, with a first security key of the set of security keys. The communications manager 920 may be configured as or otherwise support a means for communicating with the UE using the first security key based on the mapping.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for reduced processing by supporting efficient key identification for securing communications and key management.

Figure 10:
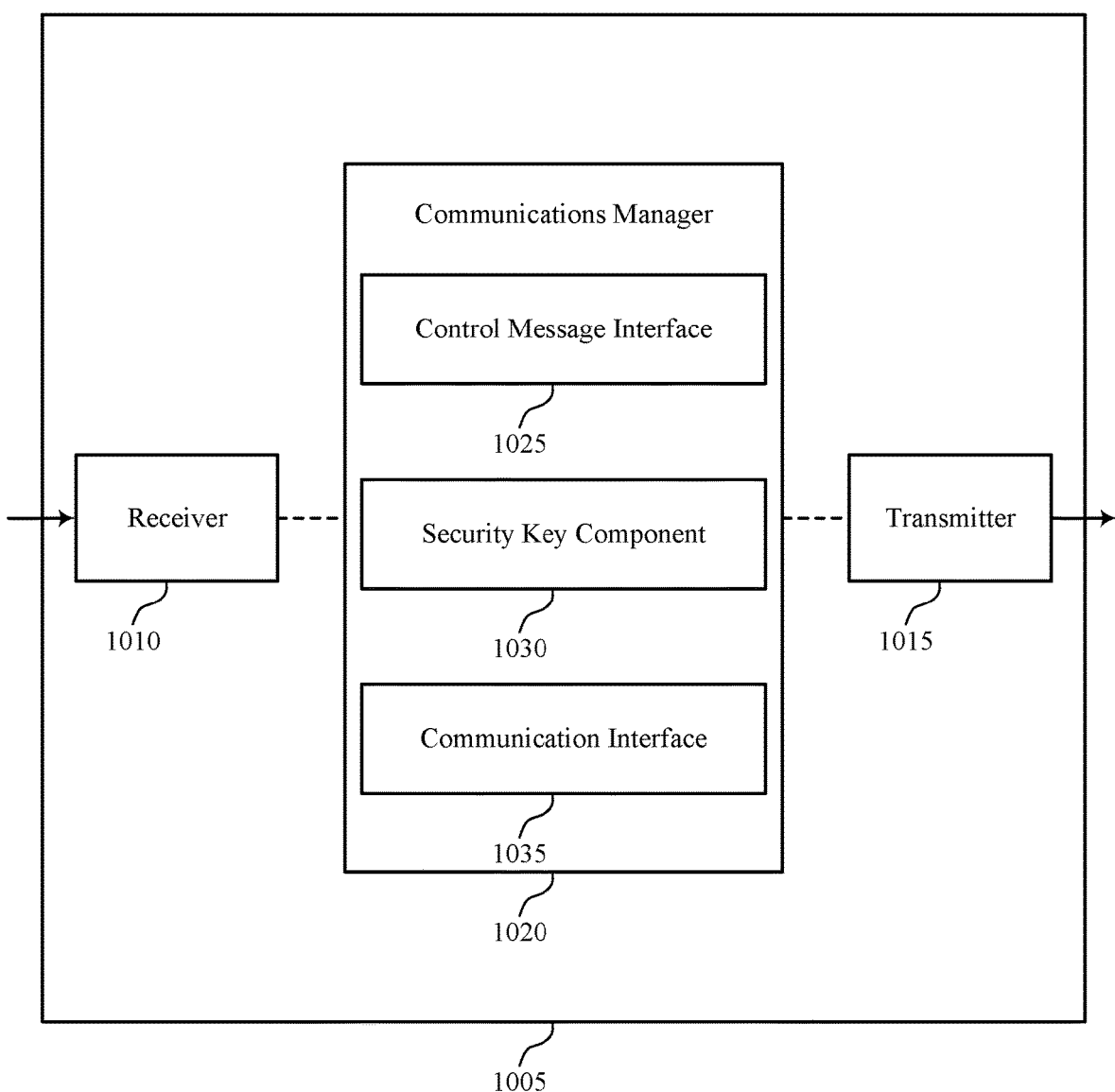

FIG. 10 shows a block diagram 1000 of a device 1005 that supports physical layer secret-key configuration and signaling in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to physical layer secret-key configuration and signaling). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to physical layer secret-key configuration and signaling). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of physical layer secret-key configuration and signaling as described herein. For example, the communications manager 1020 may include a control message interface 1025, a security key component 1030, a communication interface 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. The control message interface 1025 may be configured as or otherwise support a means for transmitting, to a UE, a first control message that includes a mapping of each security key of a set of security keys to respective security key identifiers. The security key component 1030 may be configured as or otherwise support a means for identifying that a first security key identifier is associated with one or more channels to be used for communications between the base station and the UE, the first security key identifier also associated, via the mapping, with a first security key of the set of security keys. The communication interface 1035 may be configured as or otherwise support a means for communicating with the UE using the first security key based on the mapping.

Figure 11:
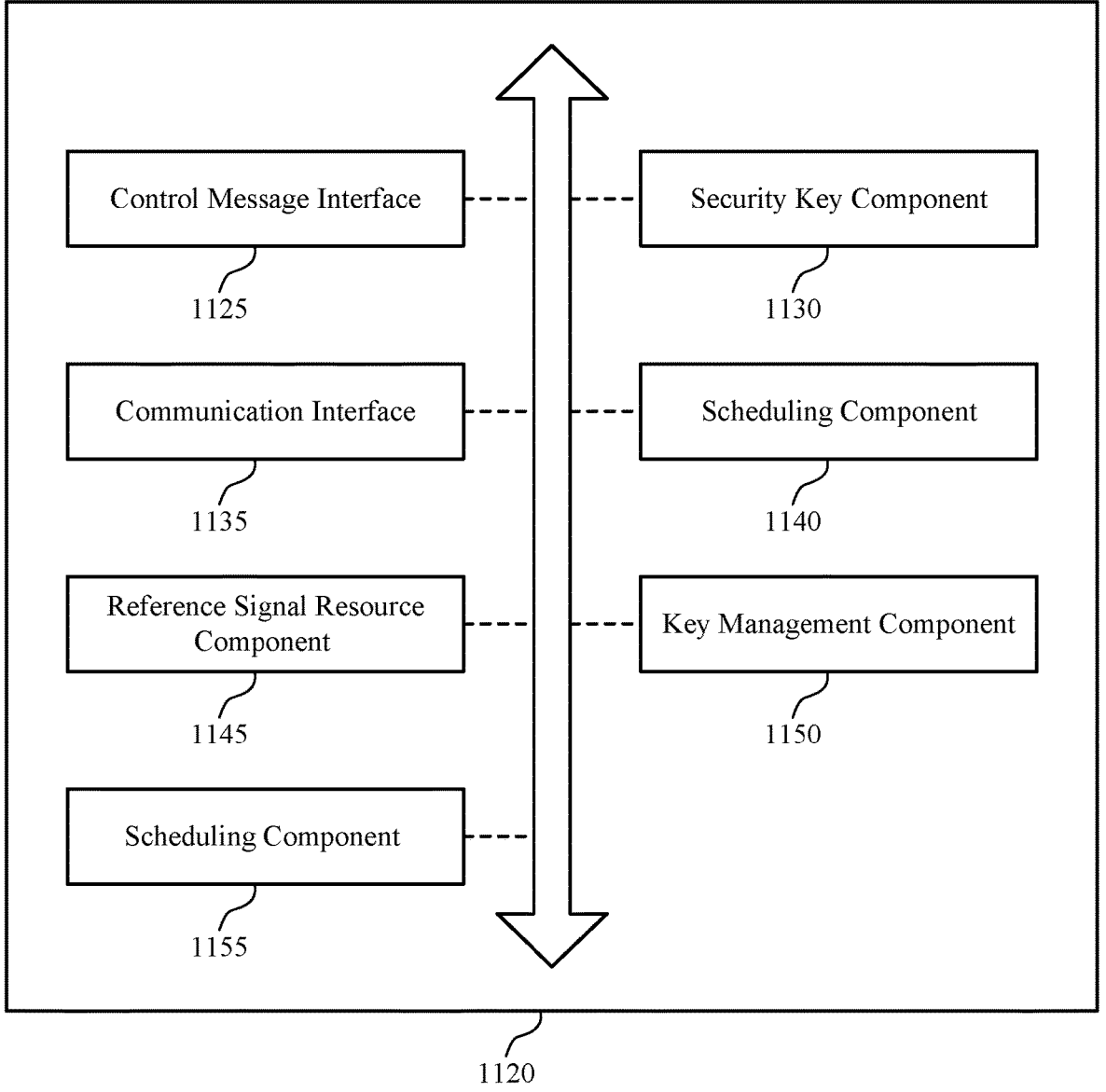
FIG. 11 shows a block diagram of a communications manager that supports physical layer secret-key configuration and signaling in accordance with aspects of the present disclosure.

FIG. 11 shows a block diagram 1100 of a communications manager 1120 that supports physical layer secret-key configuration and signaling in accordance with aspects of the present disclosure. The communications manager 1120 may be an example of aspects of a communications manager 920, a communications manager 1020, or both, as described herein. The communications manager 1120, or various components thereof, may be an example of means for performing various aspects of physical layer secret-key configuration and signaling as described herein. For example, the communications manager 1120 may include a control message interface 1125, a security key component 1130, a communication interface 1135, a scheduling component 1140, a reference signal resource component 1145, a key management component 1150, a scheduling component 1155, or any combination thereof. Each of these components may communicate, directly or indirectly, with one another (e.g., via one or more buses).

The communications manager 1120 may support wireless communications at a base station in accordance with examples as disclosed herein. The control message interface 1125 may be configured as or otherwise support a means for transmitting, to a UE, a first control message that includes a mapping of each security key of a set of security keys to respective security key identifiers. The security key component 1130 may be configured as or otherwise support a means for identifying that a first security key identifier is associated with one or more channels to be used for communications between the base station and the UE, the first security key identifier also associated, via the mapping, with a first security key of the set of security keys. The communication interface 1135 may be configured as or otherwise support a means for communicating with the UE using the first security key based on the mapping.

In some examples, to support transmitting the first control message, the control message interface 1125 may be configured as or otherwise support a means for transmitting the first control message that includes a mapping of each security key identifier corresponding to the set of security keys to respective sets of channels.

In some examples, to support identifying that the first security key identifier is associated with the one or more channels, the scheduling component 1155 may be configured as or otherwise support a means for transmitting the second control message that schedules a communication over the one or more channels associated with the first security key identifier, where the base station communicates with the UE over the one or more channels secured with the first security key.

In some examples, to support transmitting the first control message, the control message interface 1125 may be configured as or otherwise support a means for transmitting the first control message that includes the mapping of the first security key identifier to a high priority channel or to a low priority channel.

In some examples, to support identifying that the first security key identifier is associated with the one or more channels, the scheduling component 1140 may be configured as or otherwise support a means for transmitting a second control message that schedules a communication with the UE over one of the high priority channel and the low priority channel, where the base station communicates with the UE over the high priority channel secured using the first security key or over the low priority channel that is secured using the first security key in accordance with the second control message.

In some examples, to support identifying that the first security key identifier is associated with the one or more channels, the scheduling component 1140 may be configured as or otherwise support a means for transmitting a second control message that indicates that the UE is to use the first security key corresponding to the first security key identifier for securing the one or more channels, where the base station communicates with the UE over a channel of the one or more channels in accordance with the second control message.

In some examples, to support transmitting the first control message, the reference signal resource component 1145 may be configured as or otherwise support a means for transmitting the first control message that includes the mapping of each security key identifier to respective reference signal resources, where the base station generates each security key of the set of security keys using a respective reference signal resource mapped to each security key identifier.

In some examples, each reference signal resource is a sounding reference signal resource, a channel state information reference signal resource, or both.

In some examples, the key management component 1150 may be configured as or otherwise support a means for transmitting a second control message that indicates a new security key and a second security key identifier such that the set of security keys configured at the UE is updated with the new security key based on the second security key identifier.

In some examples, to support transmitting the second control message, the control message interface 1125 may be configured as or otherwise support a means for transmitting the second control message that includes an indication that the second control message includes the new security key, where the UE updates the set of security keys based on the indication included in the second control message.

In some examples, to support transmitting the second control message, the control message interface 1125 may be configured as or otherwise support a means for transmitting a medium access control layer control element message or a radio resource control message.

In some examples, to support transmitting the second control message, the control message interface 1125 may be configured as or otherwise support a means for transmitting the second control message that is secured at a higher layer than a layer on which the second control message is received.

In some examples, to support transmitting the first control message, the control message interface 1125 may be configured as or otherwise support a means for transmitting a radio resource control message that includes the mapping of each security key of the set of security keys to respective security key identifiers.

In some examples, to support identifying that the first security key identifier is associated with the one or more channels, the control message interface 1125 may be configured as or otherwise support a means for transmitting a downlink control information message or a medium access control layer control element message that indicates the first security key identifier and schedules the one or more channels.

FIG. 12 shows a diagram of a system 1200 including a device 1205 that supports physical layer secret-key configuration and signaling in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting physical layer secret-key configuration and signaling). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communications at a base station in accordance with examples as disclosed herein. For example, the communications manager 1220 may be configured as or otherwise support a means for transmitting, to a UE, a first control message that includes a mapping of each security key of a set of security keys to respective security key identifiers. The communications manager 1220 may be configured as or otherwise support a means for identifying that a first security key identifier is associated with one or more channels to be used for communications between the base station and the UE, the first security key identifier also associated, via the mapping, with a first security key of the set of security keys. The communications manager 1220 may be configured as or otherwise support a means for communicating with the UE using the first security key based on the mapping.

By including or configuring the communications manager 1220 in accordance with examples as described herein, the device 1205 may support techniques for improved security in a wireless communications system by supporting efficient use of security keys and security key management using key identifiers.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of physical layer secret-key configuration and signaling as described herein, or the processor 1240 and the memory 1230 may be otherwise configured to perform or support such operations.

FIG. 13 shows a flowchart illustrating a method 1300 that supports physical layer secret-key configuration and signaling in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving, from a base station, a first control message that includes a mapping of each security key of a set of security keys to respective security key identifiers. The operations of 1305 may be performed in accordance with examples as disclosed herein. In some examples, aspects of the operations of 1305 may be performed by a control message interface 725 as described with reference to FIG. 7.

At 1310, the method may include identifying that a first security key identifier is associated with one or more channels to be used for communications between the UE and the base station, the first security key identifier also associated, via the mapping, with a first security key of the set of security keys. The operations of 1310 may be performed in accordance with examples as disclosed herein. In some examples, aspects of the operations of 1310 may be performed by a security key component 730 as described with reference to FIG. 7.

At 1315, the method may include communicating with the base station using the first security key based on the mapping. The operations of 1315 may be performed in accordance with examples as disclosed herein. In some examples, aspects of the operations of 1315 may be performed by a communication interface 735 as described with reference to FIG. 7.

FIG. 14 shows a flowchart illustrating a method 1400 that supports physical layer secret-key configuration and signaling in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, a first control message that includes a mapping of each security key of a set of security keys to respective security key identifiers. The operations of 1405 may be performed in accordance with examples as disclosed herein. In some examples, aspects of the operations of 1405 may be performed by a control message interface 725 as described with reference to FIG. 7.

At 1410, the method may include identifying that a first security key identifier is associated with one or more channels to be used for communications between the UE and the base station, the first security key identifier also associated, via the mapping, with a first security key of the set of security keys. The operations of 1410 may be performed in accordance with examples as disclosed herein. In some examples, aspects of the operations of 1410 may be performed by a security key component 730 as described with reference to FIG. 7.

At 1415, the method may include receiving a second control message that indicates that the UE is to use the first security key corresponding to the first security key identifier for securing the one or more channels scheduled by the second control message, where the UE communicates with the base station over a channel of the one or more channels in accordance with the second control message. The operations of 1415 may be performed in accordance with examples as disclosed herein. In some examples, aspects of the operations of 1415 may be performed by a scheduling interface 740 as described with reference to FIG. 7.

At 1420, the method may include communicating with the base station using the first security key based on the mapping. The operations of 1420 may be performed in accordance with examples as disclosed herein. In some examples, aspects of the operations of 1420 may be performed by a communication interface 735 as described with reference to FIG. 7.

FIG. 15 shows a flowchart illustrating a method 1500 that supports physical layer secret-key configuration and signaling in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include receiving, from a base station, a first control message that includes a mapping of each security key of a set of security keys to respective security key identifiers. The operations of 1505 may be performed in accordance with examples as disclosed herein. In some examples, aspects of the operations of 1505 may be performed by a control message interface 725 as described with reference to FIG. 7.

At 1510, the method may include receiving the first control message that includes the mapping of each security key identifier to respective reference signal resources, where the UE generates each security key of the set of security keys using a respective reference signal resource mapped to each security key identifier. The operations of 1510 may be performed in accordance with examples as disclosed herein. In some examples, aspects of the operations of 1510 may be performed by a reference signal resource component 745 as described with reference to FIG. 7.

At 1515, the method may include identifying that a first security key identifier is associated with one or more channels to be used for communications between the UE and the base station, the first security key identifier also associated, via the mapping, with a first security key of the set of security keys. The operations of 1515 may be performed in accordance with examples as disclosed herein. In some examples, aspects of the operations of 1515 may be performed by a security key component 730 as described with reference to FIG. 7.

At 1520, the method may include communicating with the base station using the first security key based on the mapping. The operations of 1520 may be performed in accordance with examples as disclosed herein. In some examples, aspects of the operations of 1520 may be performed by a communication interface 735 as described with reference to FIG. 7.

FIG. 16 shows a flowchart illustrating a method 1600 that supports physical layer secret-key configuration and signaling in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1605, the method may include transmitting, to a UE, a first control message that includes a mapping of each security key of a set of security keys to respective security key identifiers. The operations of 1605 may be performed in accordance with examples as disclosed herein. In some examples, aspects of the operations of 1605 may be performed by a control message interface 1125 as described with reference to FIG. 11.

At 1610, the method may include identifying that a first security key identifier is associated with one or more channels to be used for communications between the base station and the UE, the first security key identifier also associated, via the mapping, with a first security key of the set of security keys. The operations of 1610 may be performed in accordance with examples as disclosed herein. In some examples, aspects of the operations of 1610 may be performed by a security key component 1130 as described with reference to FIG. 11.

At 1615, the method may include communicating with the UE using the first security key based on the mapping. The operations of 1615 may be performed in accordance with examples as disclosed herein. In some examples, aspects of the operations of 1615 may be performed by a communication interface 1135 as described with reference to FIG. 11.

The following provides an overview of aspects of the present disclosure:

Aspect 1: A method for wireless communication at a UE, comprising: receiving, from a base station, a first control message that includes a mapping of each security key of a set of security keys to respective security key identifiers; identifying that a first security key identifier is associated with one or more channels to be used for communications between the UE and the base station, the first security key identifier also associated, via the mapping, with a first security key of the set of security keys; and communicating with the base station using the first security key based at least in part on the mapping.

Aspect 2: The method of aspect 1, wherein receiving the first control message comprises: receiving the first control message that includes a mapping of each security key identifier corresponding to the set of security keys to respective sets of channels.

Aspect 3: The method of aspect 2, wherein identifying that the first security key identifier is associated with the one or more channels comprises: receiving a second control message that schedules a communication over the one or more channels that are associated with the first security key identifier, wherein the UE communicates with the base station over the one or more channels that are secured by the first security key.

Aspect 4: The method of any of aspects 1 through 3, wherein receiving the first control message comprises: receiving the first control message that includes the mapping of the first security key identifier to a high priority channel or to a low priority channel.

Aspect 5: The method of aspect 4, wherein identifying that the first security key identifier is associated with the one or more channels comprises: receiving a second control message that schedules a communication over one of the high priority channel and the low priority channel that is mapped to the first security key identifier by the first control message, wherein the UE communicates with the base station over the high priority channel secured using the first security key or over the low priority channel that is secured using the first security key in accordance with the second control message.

Aspect 6: The method of any of aspects 1 through 5, wherein identifying that the first security key identifier is associated with the one or more channels comprises: receiving a second control message that indicates that the UE is to use the first security key corresponding to the first security key identifier for securing the one or more channels scheduled by the second control message, wherein the UE communicates with the base station over a channel of the one or more channels in accordance with the second control message.

Aspect 7: The method of any of aspects 1 through 6, wherein receiving the first control message comprises: receiving the first control message that includes the mapping of each security key identifier to respective reference signal resources, wherein the UE generates each security key of the set of security keys using a respective reference signal resource mapped to each security key identifier.

Aspect 8: The method of aspect 7, wherein each reference signal resource is a sounding reference signal resource, a channel state information reference signal resource, or both.

Aspect 9: The method of any of aspects 1 through 8, further comprising: receiving a second control message that indicates a new security key and a second security key identifier; and updating the set of security keys to include the new security key using the second security key identifier.

Aspect 10: The method of aspect 9, wherein receiving the second control message comprises: receiving the second control message that includes an indication that the second control message includes the new security key, wherein the set of security keys is updated based at least in part on the indication in the second control message.

Aspect 11: The method of any of aspects 9 through 10, wherein receiving the second control message comprises: receiving a medium access control layer control element message or a radio resource control message.

Aspect 12: The method of any of aspects 9 through 11, wherein receiving the second control message comprises: receiving the second control message that is secured at a higher layer than a layer on which the second control message is received.

Aspect 13: The method of any of aspects 1 through 12, wherein receiving the first control message comprises: receiving a radio resource control message that includes the mapping of each security key of the set of security keys to respective security key identifiers.

Aspect 14: The method of any of aspects 1 through 13, wherein identifying that the first security key identifier is associated with the one or more channels comprises: receiving a downlink control information message or a medium access control layer control element message that indicates the first security key identifier and schedules the one or more channels.

Aspect 15: A method for wireless communications at a base station, comprising: transmitting, to a UE, a first control message that includes a mapping of each security key of a set of security keys to respective security key identifiers; identifying that a first security key identifier is associated with one or more channels to be used for communications between the base station and the UE, the first security key identifier also associated, via the mapping, with a first security key of the set of security keys; and communicating with the UE using the first security key based at least in part on the mapping.

Aspect 16: The method of aspect 15, wherein transmitting the first control message comprises: transmitting the first control message that includes a mapping of each security key identifier corresponding to the set of security keys to respective sets of channels.

Aspect 17: The method of aspect 16, wherein identifying that the first security key identifier is associated with the one or more channels comprises: transmitting the second control message that schedules a communication over the one or more channels associated with the first security key identifier, wherein the base station communicates with the UE over the one or more channels secured with the first security key.

Aspect 18: The method of any of aspects 15 through 17, wherein transmitting the first control message comprises: transmitting the first control message that includes the mapping of the first security key identifier to a high priority channel or to a low priority channel.

Aspect 19: The method of aspect 18, wherein identifying that the first security key identifier is associated with the one or more channels comprises: transmitting a second control message that schedules a communication with the UE over one of the high priority channel and the low priority channel, wherein the base station communicates with the UE over the high priority channel secured using the first security key or over the low priority channel that is secured using the first security key in accordance with the second control message.

Aspect 20: The method of any of aspects 15 through 19, wherein identifying that the first security key identifier is associated with the one or more channels comprises: transmitting a second control message that indicates that the UE is to use the first security key corresponding to the first security key identifier for securing the one or more channels, wherein the base station communicates with the UE over a channel of the one or more channels in accordance with the second control message.

Aspect 21: The method of any of aspects 15 through 20, wherein transmitting the first control message comprises: transmitting the first control message that includes the mapping of each security key identifier to respective reference signal resources, wherein the base station generates each security key of the set of security keys using a respective reference signal resource mapped to each security key identifier.

Aspect 22: The method of aspect 21, wherein each reference signal resource is a sounding reference signal resource, a channel state information reference signal resource, or both.

Aspect 23: The method of any of aspects 15 through 22, further comprising: transmitting a second control message that indicates a new security key and a second security key identifier such that the set of security keys configured at the UE is updated with the new security key based at least in part on the second security key identifier.

Aspect 24: The method of aspect 23, wherein transmitting the second control message comprises: transmitting the second control message that includes an indication that the second control message includes the new security key, wherein the UE updates the set of security keys based at least in part on the indication included in the second control message.

Aspect 25: The method of any of aspects 23 through 24, wherein transmitting the second control message comprises: transmitting a medium access control layer control element message or a radio resource control message.

Aspect 26: The method of any of aspects 23 through 25, wherein transmitting the second control message comprises: transmitting the second control message that is secured at a higher layer than a layer on which the second control message is received.

Aspect 27: The method of any of aspects 15 through 26, wherein transmitting the first control message comprises: transmitting a radio resource control message that includes the mapping of each security key of the set of security keys to respective security key identifiers.

Aspect 28: The method of any of aspects 15 through 27, wherein identifying that the first security key identifier is associated with the one or more channels comprises: transmitting a downlink control information message or a medium access control layer control element message that indicates the first security key identifier and schedules the one or more channels.

Aspect 29: A UE for wireless communication, comprising a processor; memory coupled with the processor; and instructions stored in the memory and executable by the processor to cause the apparatus to perform a method of any of aspects 1 through 14.

Aspect 30: A UE for wireless communication, comprising at least one means for performing a method of any of aspects 1 through 14.

Aspect 31: A non-transitory computer-readable medium storing code for wireless communication at a UE, the code comprising instructions executable by a processor to perform a method of any of aspects 1 through 14.

Aspect 32: A base station for wireless communications, comprising a processor; memory coupled with the processor; and instructions stored in the memory and executable by the processor to cause the apparatus to perform a method of any of aspects 15 through 28.

Aspect 33: A base station for wireless communications, comprising at least one means for performing a method of any of aspects 15 through 28.

Aspect 34: A non-transitory computer-readable medium storing code for wireless communications at a base station, the code comprising instructions executable by a processor to perform a method of any of aspects 15 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically eras- able programmable ROM (EEPROM), flash memory, com- pact disk (CD) ROM or other optical disk storage, magnetic disk storage or other magnetic storage devices, or any other non-transitory medium that may be used to carry or store desired program code means in the form of instructions or data structures and that may be accessed by a general- purpose or special-purpose computer, or a general-purpose or special-purpose processor. Also, any connection is prop- erly termed a computer-readable medium. For example, if the software is transmitted from a website, server, or other remote source using a coaxial cable, fiber optic cable, twisted pair, digital subscriber line (DSL), or wireless tech- nologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer- readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, inves- tigating, looking up (such as via looking up in a table, a database or another data structure), ascertaining and the like. Also, "determining" can include receiving (such as receiv- ing information), accessing (such as accessing data in a memory) and the like. Also, "determining" can include resolving, selecting, choosing, establishing and other such similar actions.

In the appended figures, similar components or features may have the same reference label. Further, various com- ponents of the same type may be distinguished by following the reference label by a dash and a second label that distinguishes among the similar components. If just the first reference label is used in the specification, the description is applicable to any one of the similar components having the same first reference label irrespective of the second refer- ence label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advanta- geous over other examples." The detailed description includes specific details for the purpose of providing an understanding of the described techniques. These tech- niques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equip- ment (UE), comprising:
   receiving, from a base station, a first control message that includes a mapping of each security key of a plurality of security keys to a respective security key identifier of a plurality of security key identifiers and of each security key identifier of the plurality of security key identifiers to a respective one or more channels;
   identifying that a first security key identifier of the plu- rality of security key identifiers is associated, via the mapping, with one or more channels to be used for communications between the UE and the base station, the first security key identifier also associated, via the mapping, with a first security key of the plurality of security keys; and
   communicating with the base station using the first secu- rity key based at least in part on the mapping.

2. The method of claim 1, wherein identifying that the first security key identifier is associated with the one or more channels comprises:
   receiving a second control message that schedules a communication over the one or more channels that are associated with the first security key identifier, wherein the UE communicates with the base station over the one or more channels that are secured by the first security key.

3. The method of claim 1, wherein receiving the first control message comprises:
   receiving the first control message that includes the map- ping of the first security key identifier to a high priority channel or to a low priority channel.

4. The method of claim 3, wherein identifying that the first security key identifier is associated with the one or more channels comprises:
   receiving a second control message that schedules a communication over one of the high priority channel and the low priority channel that is mapped to the first security key identifier by the first control message, wherein the UE communicates with the base station over the high priority channel secured using the first security key or over the low priority channel that is secured using the first security key in accordance with the second control message.

5. The method of claim 1, wherein identifying that the first security key identifier is associated with the one or more channels comprises:

receiving a second control message that indicates that the UE is to use the first security key corresponding to the first security key identifier for securing the one or more channels scheduled by the second control message, wherein the UE communicates with the base station over a channel of the one or more channels in accordance with the second control message.

6. The method of claim 1, wherein receiving the first control message comprises:

receiving the first control message that includes the mapping of each security key identifier to respective reference signal resources, wherein the UE generates each security key of the plurality of security keys using a respective reference signal resource mapped to each security key identifier.

7. The method of claim 6, wherein each reference signal resource is a sounding reference signal resource, a channel state information reference signal resource, or both.

8. The method of claim 1, further comprising:

receiving a second control message that indicates a new security key and a second security key identifier; and updating the plurality of security keys to include the new security key using the second security key identifier.

9. The method of claim 8, wherein receiving the second control message comprises:

receiving the second control message that includes an indication that the second control message includes the new security key, wherein the plurality of security keys is updated based at least in part on the indication in the second control message.

10. The method of claim 8, wherein receiving the second control message comprises:

receiving a medium access control layer control element message or a radio resource control message.

11. The method of claim 8, wherein receiving the second control message comprises:

receiving the second control message that is secured at a higher layer than a layer on which the second control message is received.

12. The method of claim 1, wherein receiving the first control message comprises:

receiving a radio resource control message that includes the mapping of each security key of the plurality of security keys to respective security key identifiers.

13. The method of claim 1, wherein identifying that the first security key identifier is associated with the one or more channels comprises:

receiving a downlink control information message or a medium access control layer control element message that indicates the first security key identifier and schedules the one or more channels.

14. A method for wireless communications at a base station, comprising:

transmitting, to a user equipment (UE), a first control message that includes a mapping of each security key of a plurality of security keys to a respective security key identifier of a plurality of security key identifiers and of each security key identifier of the plurality of security key identifiers to a respective one or more channels;

identifying that a first security key identifier of the plurality of security key identifiers is associated, via the mapping, with one or more channels to be used for communications between the base station and the UE, the first security key identifier also associated, via the mapping, with a first security key of the plurality of security keys; and communicating with the UE using the first security key based at least in part on the mapping.

15. The method of claim 14, wherein identifying that the first security key identifier is associated with the one or more channels comprises:

transmitting a second control message that schedules a communication over the one or more channels associated with the first security key identifier, wherein the base station communicates with the UE over the one or more channels secured with the first security key.

16. The method of claim 14, wherein transmitting the first control message comprises:

transmitting the first control message that includes the mapping of the first security key identifier to a high priority channel or to a low priority channel.

17. The method of claim 16, wherein identifying that the first security key identifier is associated with the one or more channels comprises:

transmitting a second control message that schedules a communication with the UE over one of the high priority channel and the low priority channel, wherein the base station communicates with the UE over the high priority channel secured using the first security key or over the low priority channel that is secured using the first security key in accordance with the second control message.

18. The method of claim 14, wherein identifying that the first security key identifier is associated with the one or more channels comprises:

transmitting a second control message that indicates that the UE is to use the first security key corresponding to the first security key identifier for securing the one or more channels, wherein the base station communicates with the UE over a channel of the one or more channels in accordance with the second control message.

19. The method of claim 14, wherein transmitting the first control message comprises:

transmitting the first control message that includes the mapping of each security key identifier to respective reference signal resources, wherein the base station generates each security key of the plurality of security keys using a respective reference signal resource mapped to each security key identifier.

20. The method of claim 19, wherein each reference signal resource is a sounding reference signal resource, a channel state information reference signal resource, or both.

21. The method of claim 14, further comprising:

transmitting a second control message that indicates a new security key and a second security key identifier such that the plurality of security keys configured at the UE is updated with the new security key based at least in part on the second security key identifier.

22. The method of claim 21, wherein transmitting the second control message comprises:

transmitting the second control message that includes an indication that the second control message includes the new security key, wherein the UE updates the plurality of security keys based at least in part on the indication included in the second control message.

23. The method of claim 21, wherein transmitting the second control message comprises:

transmitting a medium access control layer control element message or a radio resource control message.

24. The method of claim 21, wherein transmitting the second control message comprises:

transmitting the second control message that is secured at a higher layer than a layer on which the second control message is received.

25. The method of claim 14, wherein transmitting the first control message comprises:

transmitting a radio resource control message that includes the mapping of each security key of the plurality of security keys to respective security key identifiers.

26. The method of claim 14, wherein identifying that the first security key identifier is associated with the one or more channels comprises:

transmitting a downlink control information message or a medium access control layer control element message that indicates the first security key identifier and schedules the one or more channels.

27. A user equipment (UE) for wireless communications, comprising:

at least one processor;

at least one memory coupled with the at least one processor; and instructions stored in the at least one memory and executable by the at least one processor to cause the UE to:

receive, from a base station, a first control message that includes a mapping of each security key of a plurality of security keys to a respective security key identifier of a plurality of security key identifiers and of each security key identifier of the plurality of security key identifiers to a respective one or more channels;

identify that a first security key identifier of the plurality of security key identifiers is associated, via the mapping, with one or more channels to be used for communications between the UE and the base station, the first security key identifier also associated, via the mapping, with a first security key of the plurality of security keys; and communicate with the base station using the first security key based at least in part on the mapping.

28. A base station for wireless communications, comprising:

at least one processor;

at least one memory coupled with the at least one processor; and instructions stored in the at least one memory and executable by the at least one processor to cause the base station to:

transmit, to a user equipment (UE), a first control message that includes a mapping of each security key of a plurality of security keys to a respective security key identifier of a plurality of security key identifiers and of each security key identifier of the plurality of security key identifiers to a respective one or more channels;

identify that a first security key identifier of the plurality of security key identifiers is associated, via the mapping, with one or more channels to be used for communications between the base station and the UE, the first security key identifier also associated, via the mapping, with a first security key of the plurality of security keys; and communicate with the UE using the first security key based at least in part on the mapping.

* * * * *